United States Patent
Gervais et al.

(10) Patent No.: US 6,636,980 B1
(45) Date of Patent: Oct. 21, 2003

(54) SYSTEM FOR LAUNCHING DATA ON A BUS BY USING FIRST CLOCK FOR ALTERNATELY SELECTING DATA FROM TWO DATA STREAMS AND USING SECOND CLOCK FOR LAUNCHING DATA THEREAFTER

(75) Inventors: Gilles Gervais, Austin, TX (US); David George Caffo, Austin, TX (US); James Nolan Hardage, Jr., Austin, TX (US); Stephen Douglas Weitzel, Round Rock, TX (US)

(73) Assignees: International Business Machines Corporation, Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/377,632

(22) Filed: Aug. 19, 1999

(51) Int. Cl.[7] .............................. G06F 1/06; G06F 5/06
(52) U.S. Cl. ........................ 713/600; 713/501; 710/305
(58) Field of Search .................................. 713/400, 401, 713/500, 501, 503, 600, 601; 710/129; 711/100, 105, 154; 365/189.02, 189.05, 194; 326/62, 93

(56) References Cited

U.S. PATENT DOCUMENTS

| 5,968,180 | A | * | 10/1999 | Baco | 713/400 |
| 6,260,154 | B1 | * | 7/2001 | Jeddeloh | 713/401 |
| 6,308,229 | B1 | * | 10/2001 | Masteller | 710/52 |
| 6,330,683 | B1 | * | 12/2001 | Jeddeloh | 713/401 |
| 6,334,163 | B1 | * | 12/2001 | Dreps et al. | 710/129 |
| 6,347,367 | B1 | * | 2/2002 | Dell et al. | 711/170 |
| 6,373,751 | B1 | * | 4/2002 | Bondurant | 365/189.05 |

FOREIGN PATENT DOCUMENTS

JP        06124586 A    *  5/1994

* cited by examiner

*Primary Examiner*—Thomas Lee
*Assistant Examiner*—Thuan Du
(74) *Attorney, Agent, or Firm*—Barry S. Newberger; Winstead Sechrest & Minick P.C.; Robert M. Carwell

(57) ABSTRACT

A bus interface apparatus and method are implemented. A pair of data streams is generated from the stream of data to be launched onto a data bus. Each stream is staged along a corresponding data path that includes a plurality of storage elements. Each path feeds an input of a multiplexer (MUX). The output of the MUX drives the bus, and the MUX selects a data value for launching onto the bus in response to a signal derived from an internal bus clock. The internal bus clock is also used to generate a bus clock that is output to the bus along with the data. The period of the bus clock may be a preselected multiple of the period of a processor clock. The data is staged along the two data streams in response to clocking signals derived from the processor clock. Each of the clocking signals is qualified by a corresponding hold signal, that, when asserted, holds the clocking signals in a predetermined state. The hold signals are generated in response to a plurality of control signals that are used to select the ratio of bus clock period to processor clock period. The bus interface may be asynchronously started in response to a signal from the startup logic in the central processing unit (CPU).

24 Claims, 23 Drawing Sheets

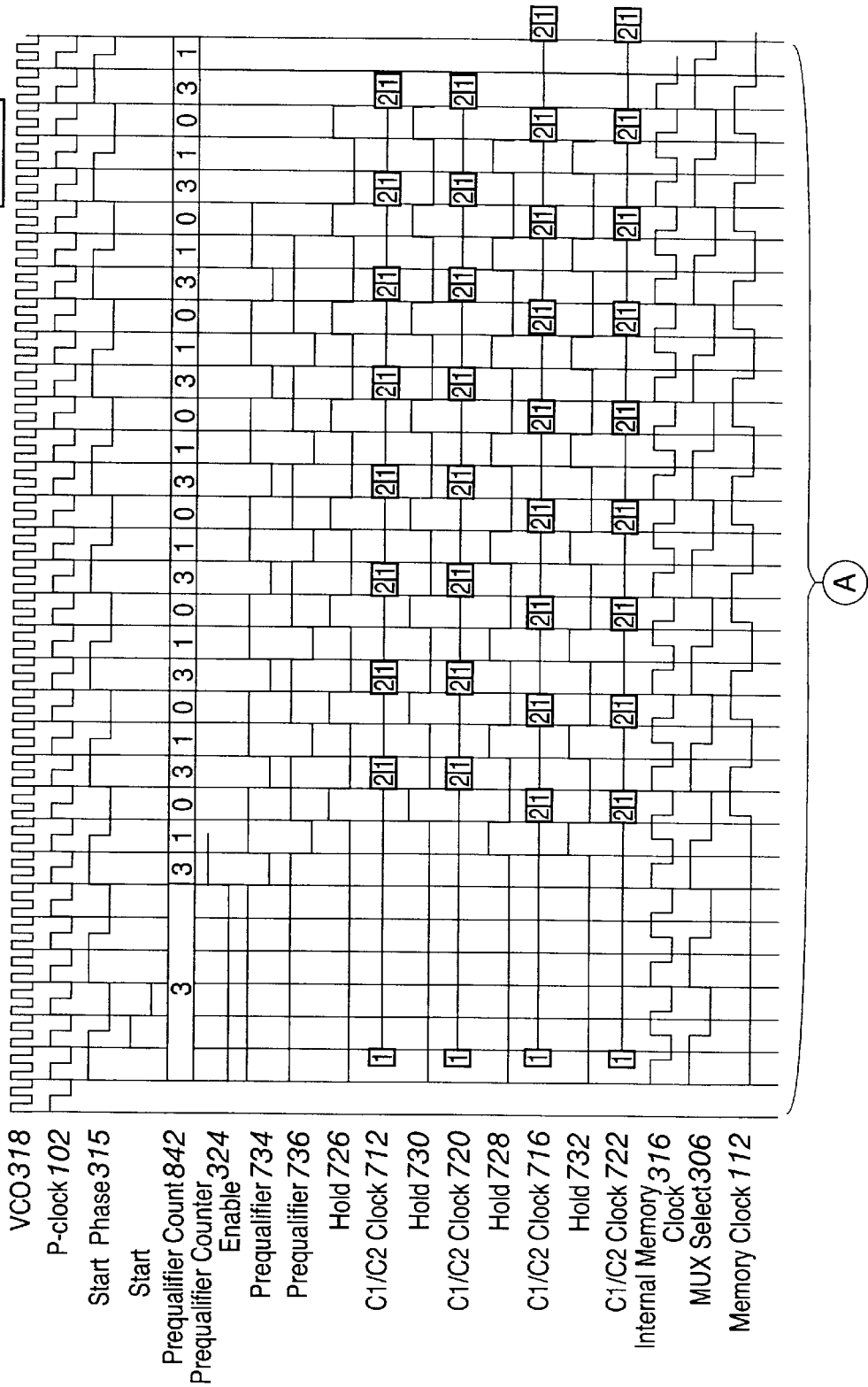

SYSTEM FOR LAUNCHING DATA ON A BUS BY USING FIRST CLOCK FOR ALTERNATELY SELECTING DATA FROM TWO DATA STREAMS AND USING SECOND CLOCK FOR LAUNCHING DATA THEREAFTER

CROSS-REFERENCE TO RELATED APPLICATION

The present application is related to that commonly owned U.S. patent application, Ser. No. 09/388,952, entitled "Memory Clock Generator and Method Therefor," now U.S. Pat. No. 6,550,013, hereby incorporated herein by reference.

TECHNICAL FIELD

The present invention relates in general to data processing systems, and in particular, to the launch of data on a bus for writing to double data rate (DDR) synchronous random access memory.

BACKGROUND INFORMATION

A processor chip (which may also be referred to as a central processing unit, or ("CPU")) interfaces to off-chip memory for storage of data and instructions. Modern data processing systems typically employ, as off-chip random access memory, synchronous random access memory in which memory transactions are synchronized to edges of a memory clock signal. The memory clock signal is provided by the CPU. A particular data value to be stored in memory is asserted on the memory interface by the CPU for only a brief instant, timed by signals derived from the CPU's clock, which signals are also provided to the synchronous memory as the memory clock.

Conventionally, the values to be stored are transferred through latches to which the timing signals are applied. FIG. 1A illustrates a portion 100 of a CPU including prior art bus interface mechanisms. Processor clock ("p-clock") signal 102 is generated via a p-clock generator 104 and distributed throughout the processor chip through one or more p-clock distribution networks 106. (The p-clock is sometimes referred to as the "GCLK".) P-clock 102 also provides a reference signal to a phase-locked loop (PLL) 108 that controls a voltage controlled oscillator (VCO) 110 that together generate memory clock 112 which is thereby derived from, and phase-locked to, p-clock 102. Memory clock 112 is distributed through one or more memory clock distribution nets 113.

Data transfers to memory are launched from, or transfers from memory are received at, diverse locations on the CPU chip, not merely in one central location. If data transfers were centralized, numerous problems would arise. These include noise from a concentration of near-simultaneous switching events, wiring congestion and path length disparities for both the data and clock paths because some locations in the chip would be relatively more remote than others from the central data transfer location. Consequently, data transfers are decentralized, and data is distributed from its source via one or more data distribution nets 114, and stored in latch pairs, or registers, 116. Data is generated, and stored, in the processor clock domain.

Data to be stored in memory is distributed to the CPU chip boundary via data distribution nets 114, and launched onto memory bus 118. Data is launched in response to memory clock 112 via a plurality of latches 120 which incorporate a master-slave latch pair, denoted latch L1 and latch L2 having an input internally coupled to an output of the L1 latch.

Although distributing data transfer locations on the CPU chip does mitigate the aforementioned problems, data signals are typically substantially skewed relative to the timing signals, for example memory clock 112, at the data transfer locations on the chip boundary. Furthermore, the amount of skew may vary due to the variation in path lengths for the data and timing signals, which variation may be substantial. This is illustrated in the timing diagram in FIG. 1B. In the embodiment illustrated in FIG. 1B, data 122 input to latch 120 is latched on a rising edge of memory clock 112. Portions "A", "B", and "C" are launched at edges $t_1$, $t_2$, and $t_3$, respectively. Due to the skew, $T_s$, in the arrival times of data 122 and the corresponding edge of memory clock 112, a center of the data valid interval for data 122 is shifted relative to the edges of memory clock 112. As a consequence, data 122 has excessive setup time, $T_{su}$, and short hold time, $T_h$. If the hold time becomes too short, shorter than the hold time specified by the manufacturer of the synchronous memory, the memory write may result in erroneous data being stored in memory.

Conventionally, the skew problem has been addressed by tuning of the electrical characteristics associated with the conduction paths to adjust effective path lengths. In this way, the skew of the data and timing signals at the data transfer points on the CPU boundary are controlled. However, advances in CPU technology make this conventional approach increasingly problematic. Higher frequency operation, smaller conductor cross-sections, smaller separation between conductors, and longer conduction paths all exacerbate the limiting of the signal skew using conventional approaches. Moreover, as CPU speeds increase, bus clocks speeds become more important in determining the overall performance of the data processing system. Thus, bus clock speeds must increase in order to keep pace with the increase in CPU performance. This trend in bus clock speeds further increases the constraints on data and timing signal skew. Thus, there is a need in the art for apparatus and methods that mitigate the skew in the data and timing signals in data transfers to memory in data processing systems, as well as mitigating sensitivities to sources of skew arising from manufacturing processes and CPU operation.

SUMMARY OF THE INVENTION

The aforementioned needs are addressed by the present invention. Accordingly, there is provided, in a first form, a bus interface apparatus. The apparatus includes circuitry operable for receiving a first data stream for outputting on a bus and generating second and third data streams in response to the first data stream. Also included is selection circuitry operable for alternatively selecting from the second and third data streams a sequence of data values for outputting on the bus, wherein the selection circuitry selects for outputting in response to a select signal, wherein the select signal is generated in response to a first bus clock, and circuitry for outputting a second bus clock to the bus in response to the first bus clock, a data valid interval of each value of the sequence of data values having a skew with respect to the second bus clock determined by the circuitry operable for generating the second and third data streams.

There is also provided, in a second form, a method of launching data on a bus. The method includes the steps of receiving a first data stream operable for launching on the data bus, and generating second and third data streams in response to the first data stream. The method further constitutes receiving a first bus clock and generating a select signal in response thereto, and alternately selecting from the second and third data streams a sequence of data values for launching on the bus in response to the select signal.

Additionally, there is provided, in a third form, a data processing system. The system contains a memory coupled to a memory bus, and a central processing unit (CPU), the CPU including a bus interface coupled to the memory bus. The bus interface includes circuitry operable for receiving a first data stream for outputting on the memory bus and generating second and third data streams in response to the first data stream. Also contained in the bus interface is selection circuitry operable for alternatively selecting from the second and third data streams a sequence of data values for outputting on the bus, wherein the selection circuitry selects for outputting in response to a select signal, wherein the select signal is generated in response to a first bus clock. Circuitry within the bus interface is included for outputting a second bus clock to the memory bus in response to the first bus clock, a data valid interval of each value of the sequence of data values having a skew with respect to the second bus clock determined by the circuitry operable for generating the second and third data streams.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
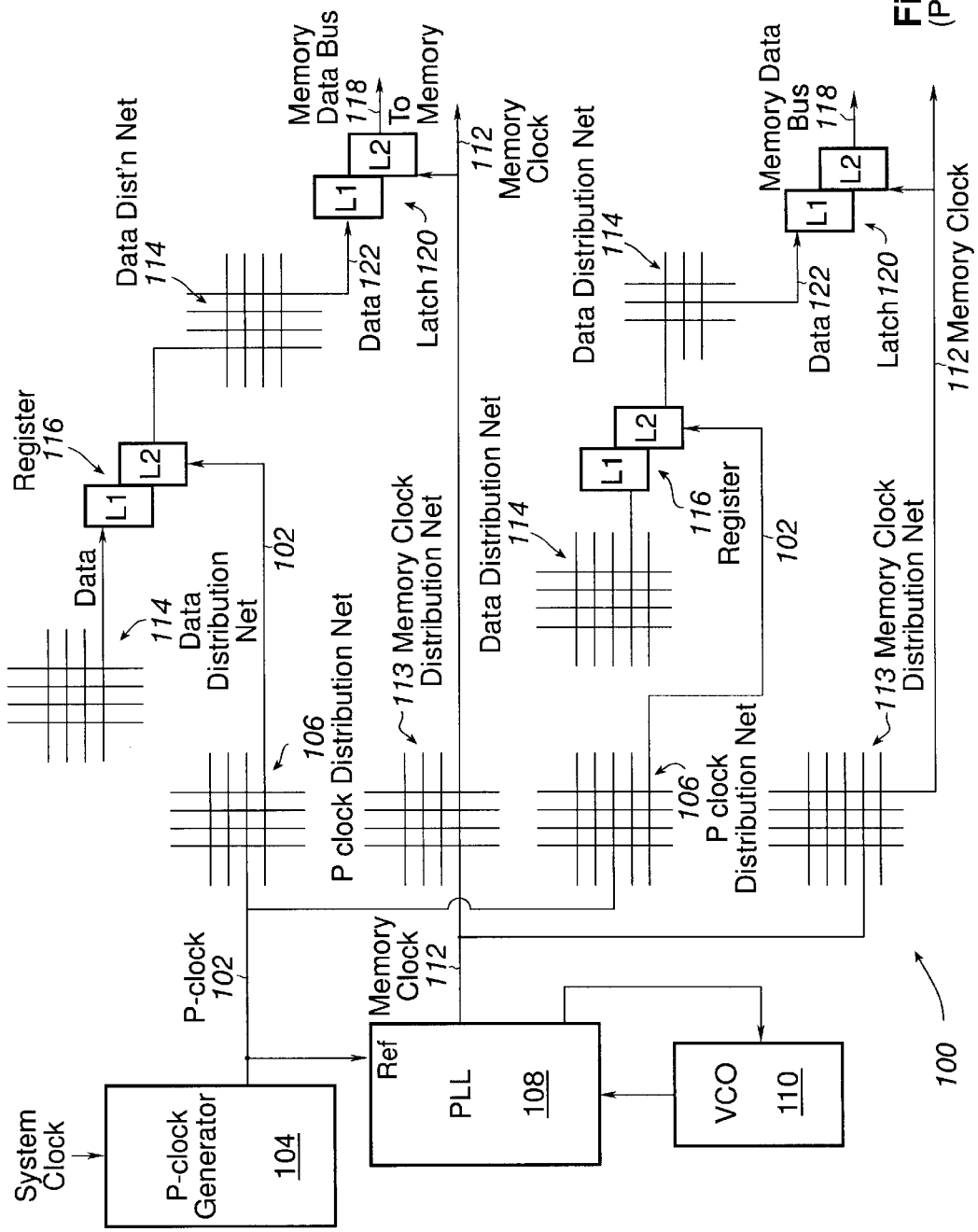
FIG. 1A illustrates, in block diagram form, a portion of a central processing unit (CPU) in accordance with the prior art.
Figure 1B:
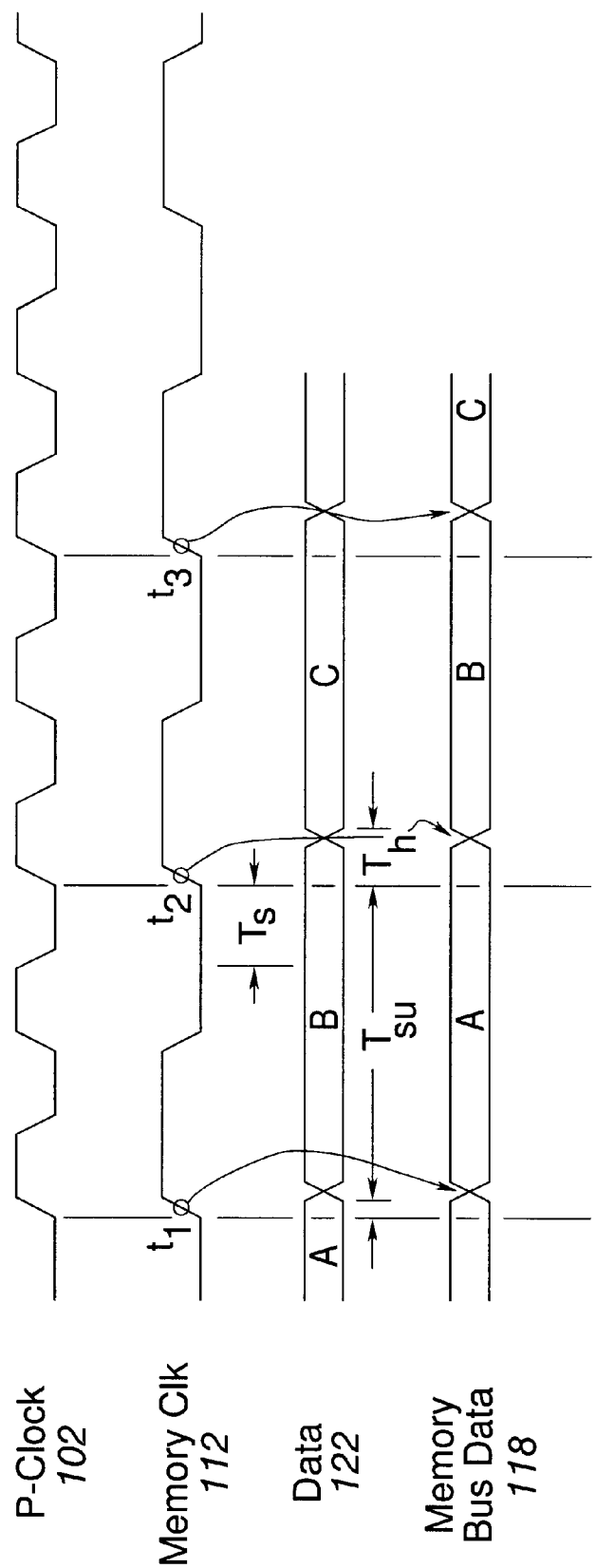
FIG. 1B schematically illustrates a timing diagram in accordance with the prior art CPU of FIG. 1A.

A memory bus interface mechanism is provided. The mechanism launches data on a bus between a central processing unit incorporating the mechanism and double data rate (DDR) synchronous random access memory. A multiplexer (MUX) selects between two stable data streams, data to be stored in the memory. The MUX selects in response to a select signal generated by an internal memory clock from which a bus clock is also derived. The internal memory clock is obtained from the processor (p-clock), in open-loop fashion. Thus, the internal memory clock may have a predetermined frequency relationship to the p-clock, but is not necessarily maintained by a closed loop system. The generation of the internal memory clock is described in the commonly-owned co-pending U.S. patent application Ser. No. 09/388,952 (Attorney Docket No. HQ9-99-036) entitled "Memory Clock Generator and Method Therefor", incorporated herein by reference.

The two stable data streams for inputting into the MUX are generated by a staging unit that receives a stream of data for outputting to memory from one of the data distribution networks in the CPU. The staging of the data, that is the timing of the assertion of the data earlier than the reference edge of the memory clock, is accomplished via the clocking of latches, rather than the conventional memory clock "delay line" approach. The multiplexer then provides for the launching of the data onto the memory bus at the double data rate expected by the DDR memory.

Operation of the present invention will subsequently be described in greater detail. Prior to that discussion, however, a description of connectivity of the elements of the present invention will be provided.

DESCRIPTION OF CONNECTIVITY

In the following description, numerous specific details, such as clock edges, etc. are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. In the following description of the present invention, the terms "assert" and "negate", and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Refer now to the drawings wherein depicted elements are not necessarily shown to scale and wherein like or similar elements are designated by the same reference numeral through the several views.

Figure 2:
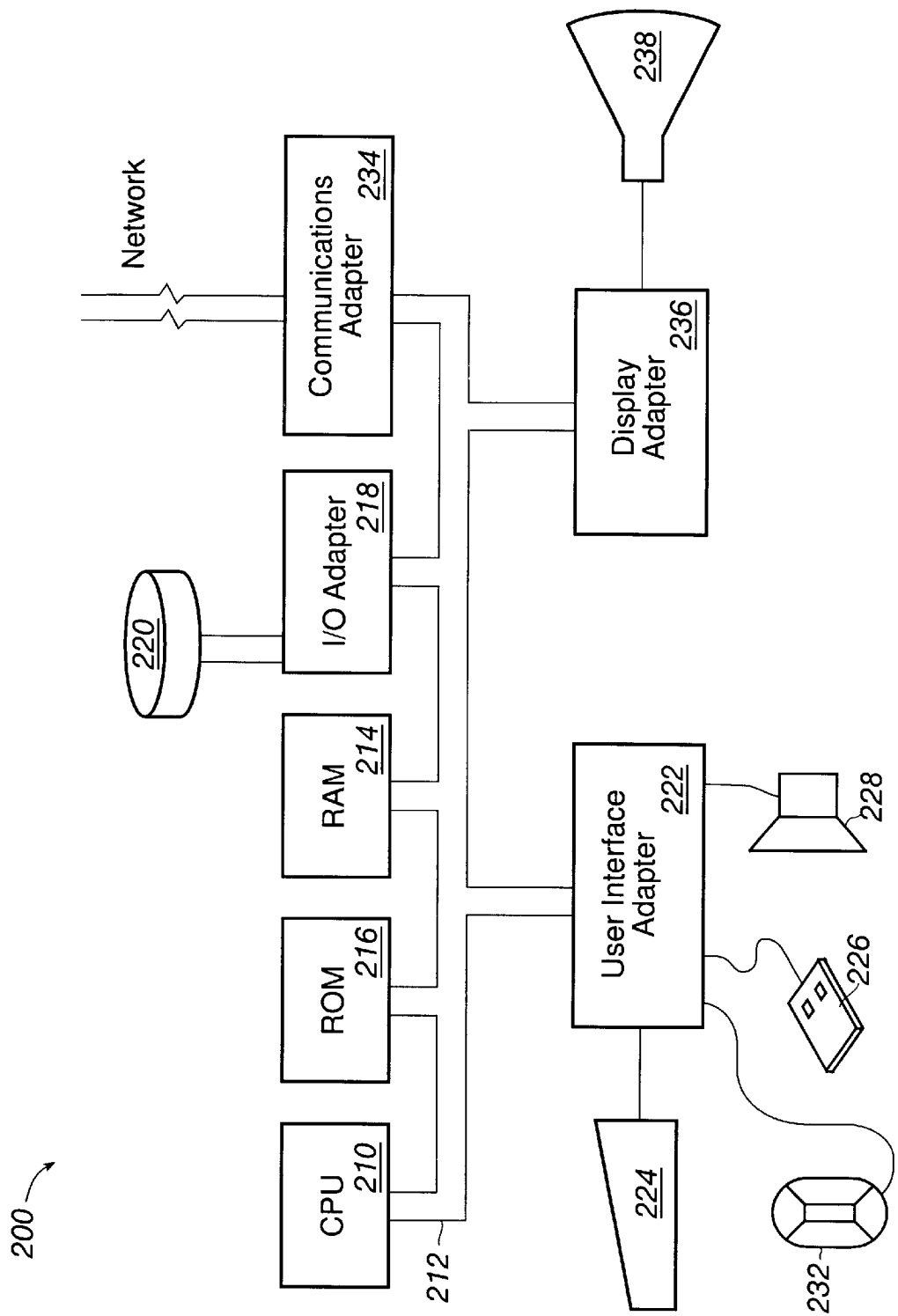
FIG. 2 illustrates, in block diagram form, a data processing system in accordance with an embodiment of the present invention.

Referring first to FIG. 2, an example is shown of a data processing system 200 which may be used for the present invention, which illustrates a typical hardware configuration of data processing system 200 in accordance with the subject invention having central processing unit (CPU) 210, and a number of other units interconnected via system bus 212. CPU 210 includes a bus interface mechanism in accordance with the present invention. Data processing system 200 includes random access memory (RAM) 214, read only memory (ROM) 216, and input/output (I/O) adapter 218 for connecting peripheral devices such as disk units 220 to bus 212, user interface adapter 222 for connecting keyboard 224, mouse 226, and/or other user interface devices such as a touch screen device (not shown) to bus 212, communication adapter 234 for connecting data processing system 200 to a data processing network, and display adapter 236 for connecting bus 212 to display device 238. RAM 214 may be DDR synchronous random access memory. CPU 210 may include other circuitry not shown herein, which will include circuitry commonly found within a microprocessor, e.g., execution unit, arithmetic logic unit, etc. CPU 210 may also reside on a single integrated circuit.

Figure 3:
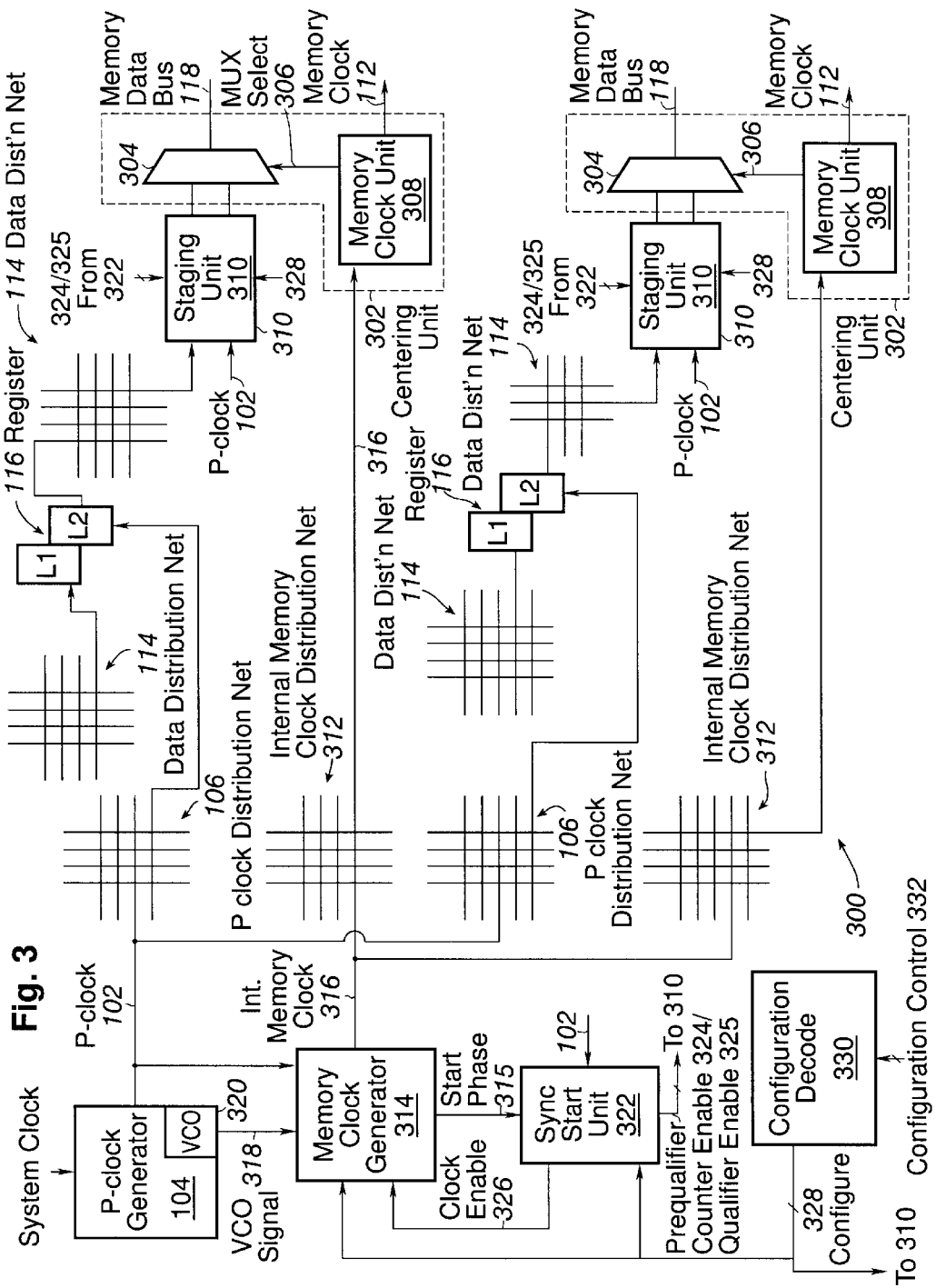
FIG. 3 illustrates, in block diagram form, a portion of a CPU in accordance with an embodiment of the present invention.

FIG. 3 illustrates the portion 300 of a CPU in accordance with an embodiment of the present invention. Data is launched to memory via a plurality of centering units 302. Each centering unit 302 includes a multiplexer (MUX) 304 which selects between a pair of inputs in response to MUX select 306 from memory clock unit 308. The multiplexer inputs are coupled to staging unit 310. Staging unit 310 receives the data stream to be loaded in the memory via data distribution networks 104.

Each memory clock unit 308 is coupled to an internal memory clock distribution net 312. Portion 300 may include a plurality of internal memory clock nets 312.

The internal memory clock is generated by memory clock generator 314 which outputs internal memory clock 316. Memory clock generator 314 receives p-clock 102 as well as VCO signal 318 from VCO 320 and p-clock generator 104. VCO signal 318 is used to clock latches within memory clock generator 314 as described in the commonly owned co-pending U.S. Patent Application entitled "Memory Clock Generator and Method Therefor" (Attorney Docket No. HQ9-99-036) now U.S. Pat. No. 6,550,013, incorporated herein by reference. Synchronization start unit 322 provides a prequalifier counter enable signal 324 to staging units 310. Additionally, synchronous start unit 322 also sends clock enable 326 to memory clock generator 314 to start the memory clock and memory clock 314 provides start phase 315 to start unit 322. Start phase 315 marks the alignment of edges of VCO 318 and p-clock 102 and internal memory clock 316 as described in the aforementioned commonly owned, co-pending U.S. Patent Application. Configure signals 328 set a ratio between a period of internal memory clock 316 and p-clock 102. Configure signals 328 are provided by configuration decode 330 in response to configuration control signals 332. In an embodiment of the present invention, configuration control 332 may be a three-bit signal and configuration decode 330 may be a one-of-five decoder in which a corresponding one of configure 328 represents a processor clock ratio of two times, two and one-half times, three times, three and one-half times, and four times.

Figure 4:
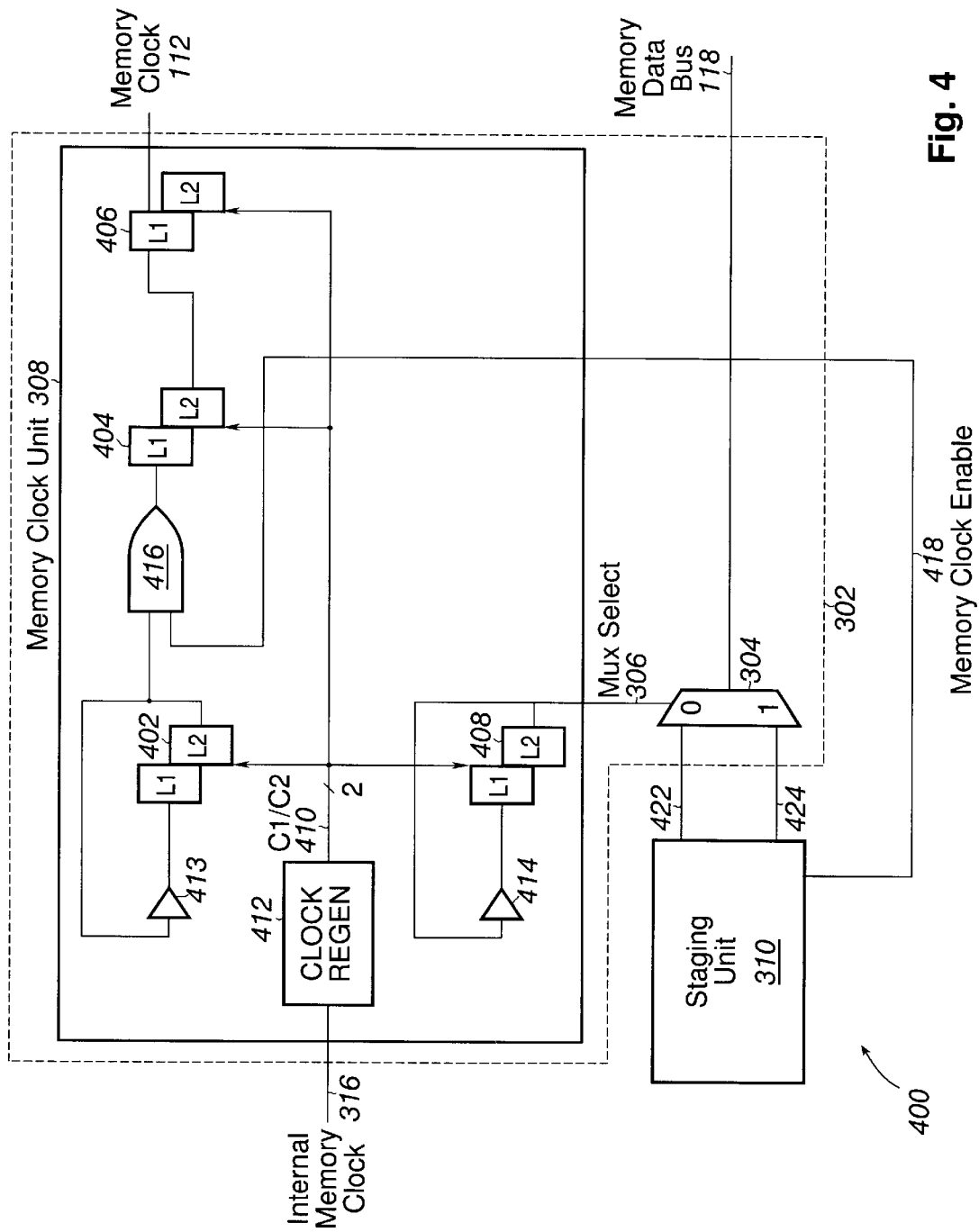
FIG. 4 illustrates, in block diagram form, a portion of the CPU of FIG. 3, in accordance with an embodiment of the present invention.

Refer now to FIG. 4 illustrating another CPU portion 400 depicting, in further detail, a portion of the CPU in accordance with an embodiment of the present invention. Portion 400 includes centering unit 302 and staging unit 310.

Memory clock 112 is output by memory clock unit 308. Memory clock unit 308 includes latch pairs 402, 404, 406, and 408. Each of latch pairs 402–408 is clocked by a clock signal, C1/C2 410, output by clock regenerator 412. Clock regenerator 412 derives clock signal 410 from internal memory clock 316, FIG. 3.

Figure 5A:
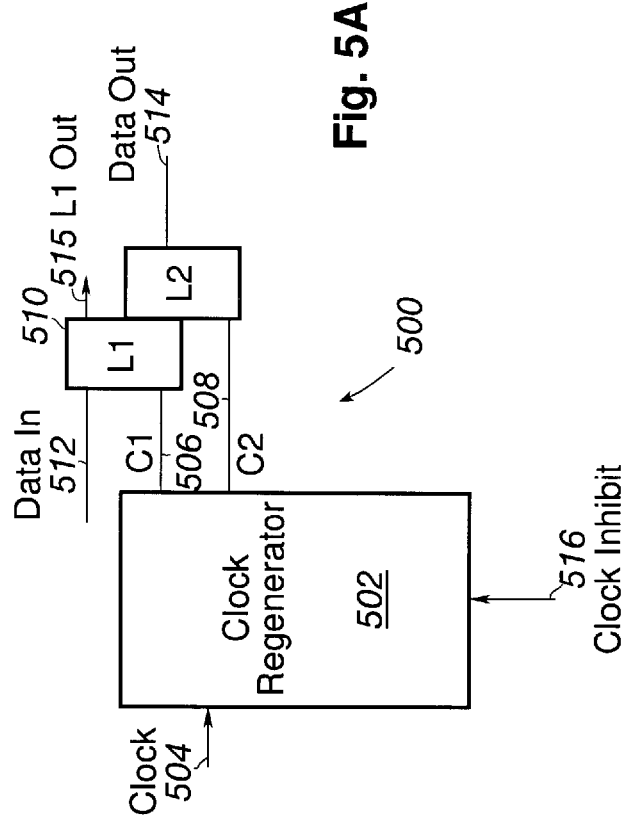
FIG. 5A illustrates, in block diagram form, latching circuitry that may be used in an embodiment of the present invention.
Figure 5B:
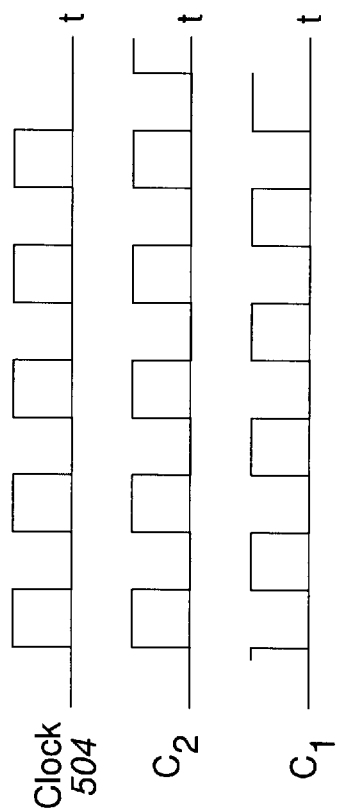
FIG. 5B illustrates a timing diagram in conjunction with the latching circuitry of FIG. 5A.

The clocking of latch pairs 402–408 may be further understood by referring to FIG. 5A illustrating a latch pair clock regenerator combination 500 which may be used in the present invention. Clock regenerator 502 receives clock signal 504, and outputs a pair of clock signals, C1 506, and clock C2 508 coupled respectively to latches L1 and L2 of latch pair 510. Clocks C1 and C2 are synchronous with clock 504 and are shifted in phase by one-half period with respect to each other. This is illustrated in the timing diagram shown in FIG. 5B. In the embodiment of clock regenerator latch pair combination 500 corresponding to the timing diagram in FIG. 5B, C2 is in phase with clock 504 and C1 is shifted in phase by one-half period, or 180°. However, an alternative embodiment of the present invention could be implemented in which C1 may have the phase of clock 504 and C2 be shifted by 180°. It would be understood by an artisan of ordinary skill that such an embodiment would be within the spirit and scope of the present invention.

Input data 512 is input to latch L1, and falls through to an output of L1 coupled internally to an input of latch L2 on a first predetermined value (the "active" state) of C1 506. On a transition from the first predetermined level of C1 to a second predetermined level (the "inactive" state), the value of input data 512 latches into latch L1, and is held independent of any change in state of the value of input data 512 thereafter, until the next transition of C1 from the second predetermined level to the first predetermined level. Because of the phase shift between C1 and C2, the data input to latch L2 flushes through to data out 514 when clock C2 508 has the second predetermined logic value and is held in latch L2 when C2 transitions from the second predetermined logic value to the first predetermined logic value. Because, in latch pair 510 the output of latch L1 is internally coupled to the input of latch L2, a change in input data 512 when clock C2 has the first predetermined logic value flushes through to the input of latch L2, but because, in that state of clock C2, latch L2 holds data, the change in input data 512 does not appear on data out 514. Additionally, an external output from the L1 latch, L1 out 515, may be provided.

Clock regenerator 502 may also be provided with a clock inhibit signal 516. When clock inhibit 516 is asserted, clocks C1 and C2 are held, although the phase relationship is maintained, in the sense that clock C1 and C2 assume complementary logic values. In an embodiment of the present invention, the C1 clock may be held in active state, and the C2 clock in the inactive state. Clock regenerator 502 may also include a delay element whereby clock inhibit is delayed by a predetermined amount of time following the assertion thereof. In such an embodiment, the holding of the C1/C2 clocks is delayed by the predetermined delay time after the assertion of inhibit 516. Clock regenerator 412, in FIG. 4 does not receive a clock inhibit signal, such as clock inhibit 516. However, the clocking of latch pairs including hold signals will be described below in conjunction with staging unit 310, FIG. 3.

Returning now to FIG. 4, latch pairs 402 and 408 in combination with inverters 413 and 414, respectively, form divide-by-two elements, whereby a frequency of internal memory clock 316, from which C1/C2 signal 410 is derived, is divided by two. An output of latch pair 408 provides MUX select 306. An output of latch pair 402 is provided to an input of AND gate 416. The second input of AND gate 416 receives memory clock enable 418 from staging unit 310. An output of AND gate 416 is coupled to an input of latch pair 404, which provides a delay of one cycle of internal memory clock 316. An output of latch L2 with latch pair 404 is coupled to an input of latch L1 of latch pair 406. Memory clock 112 is provided at an output of latch L1 of latch pair 406. Thus, latch 406 inserts a delay of one-half period of internal memory clock 316 into memory clock 112.

An output of latch L2 in latch pair 408 forms MUX select 306 provided to MUX 304. As previously described, latch pair 408 and inverter 414 constitute a divide-by-two circuit whereby MUX select 306 is a periodic signal having a frequency half the frequency of C1/C2 clock signal 410. Thus, MUX 304 alternatively selects for outputting memory data bus 118 from datastream 422 and 424 provided by staging unit 310. The operation of staging unit 310 will be further described below.

Figure 6:
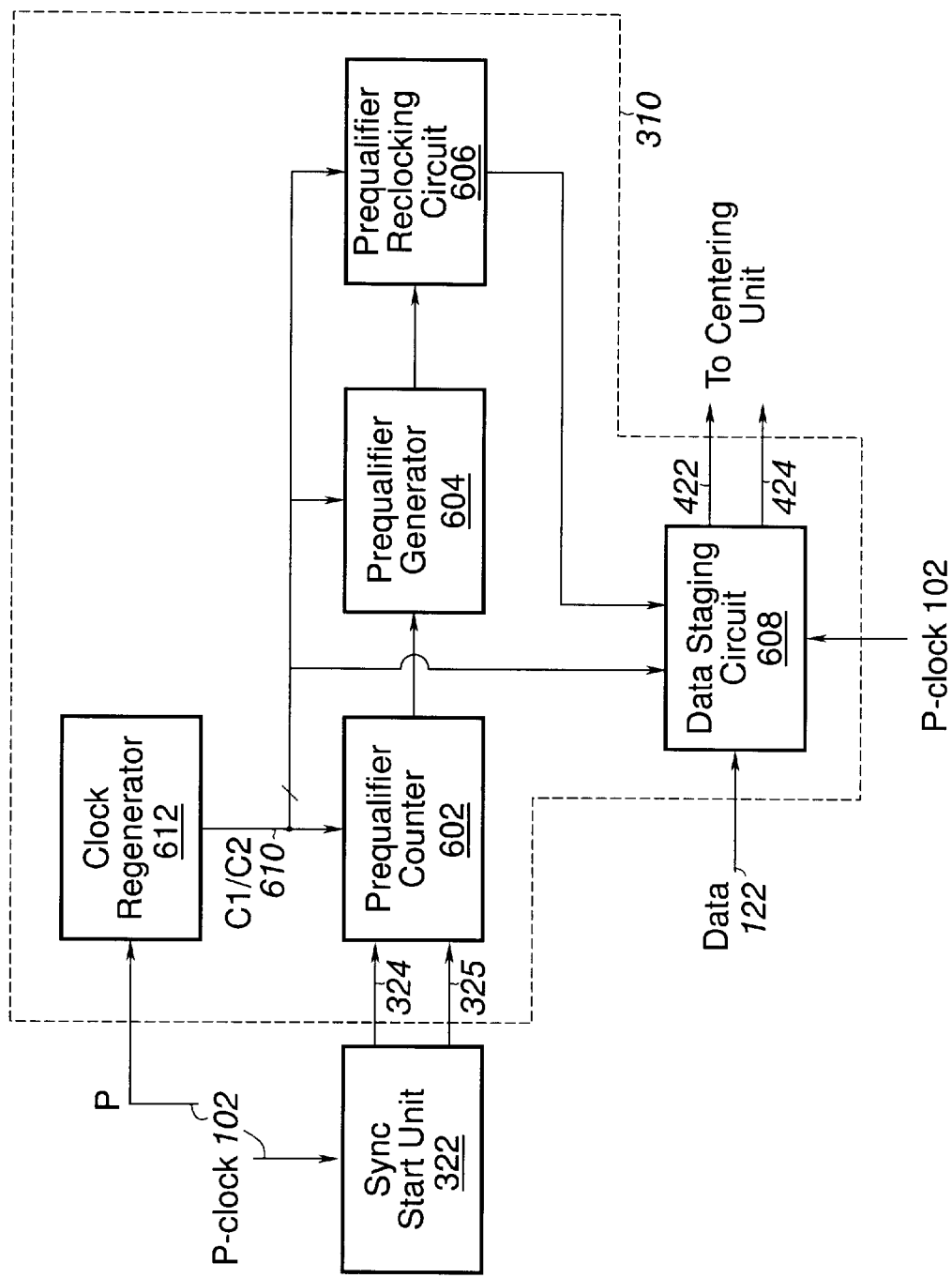
FIG. 6 illustrates, in block diagram form, another portion of the CPU of FIG. 3 in accordance with an embodiment of the present invention.

Refer now to FIG. 6 illustrating staging unit 310 in further detail. Staging unit 310 includes prequalifier counter 602, prequalifier generator 604, prequalifier reclocking circuit 606, and data staging circuit 608. Prequalifier counter 602 is coupled to synchronous ("synch") start unit and receives prequalifier counter enable signal 324 and qualifier enable signal 325 therefrom. Additionally, each of prequalifier counter 602, prequalifier generator 604, prequalifier reclocking circuit 606 and data staging circuit 608 receives a C1/C2 clock 610 generated from p-clock 102 by at least one clock regenerator 612.

Figure 7A:
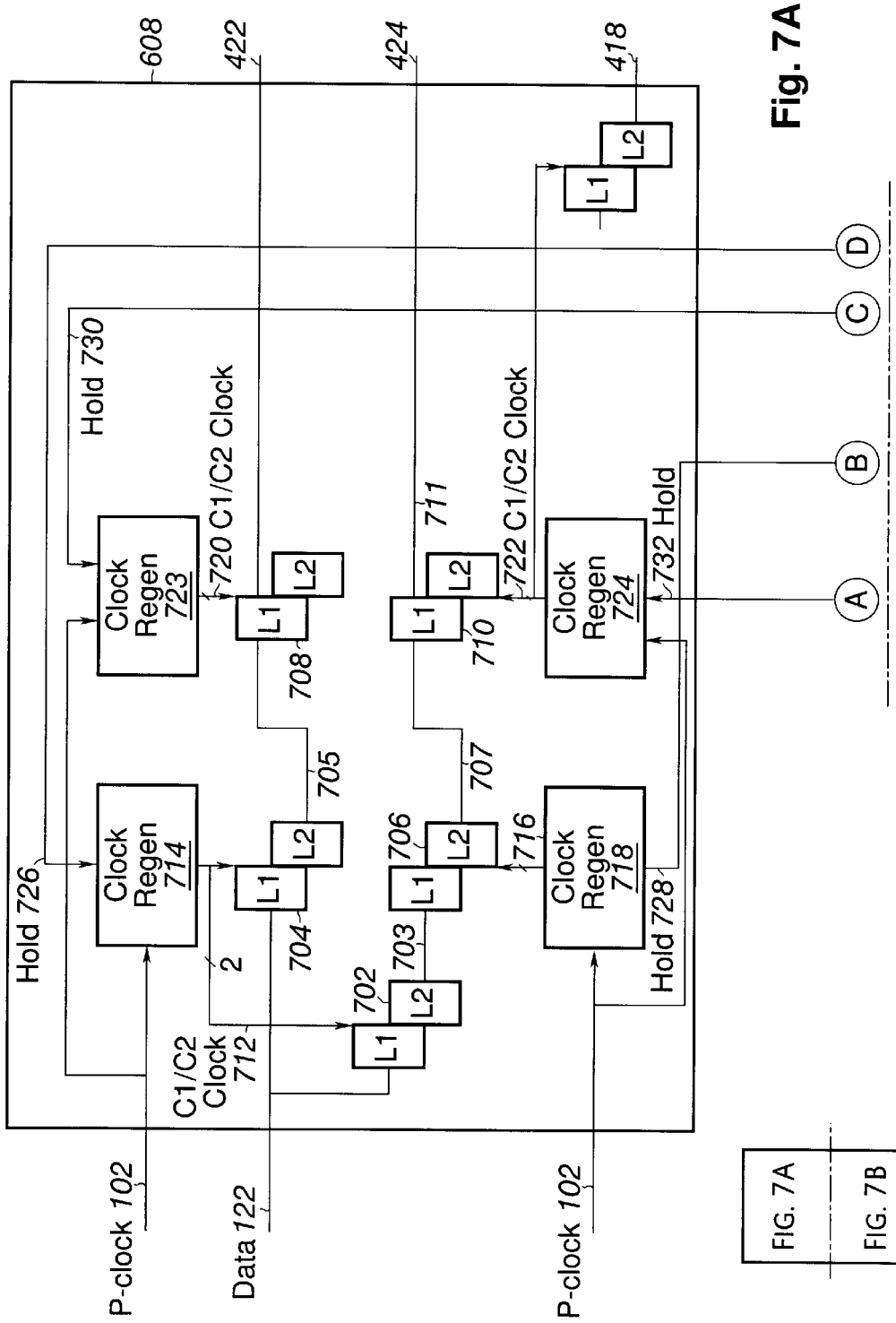
FIG. 7 illustrates, in partial schematic form, the data staging and prequalifier reclocking circuit of FIG. 6 in accordance with an embodiment of the present invention.
Figure 7B:
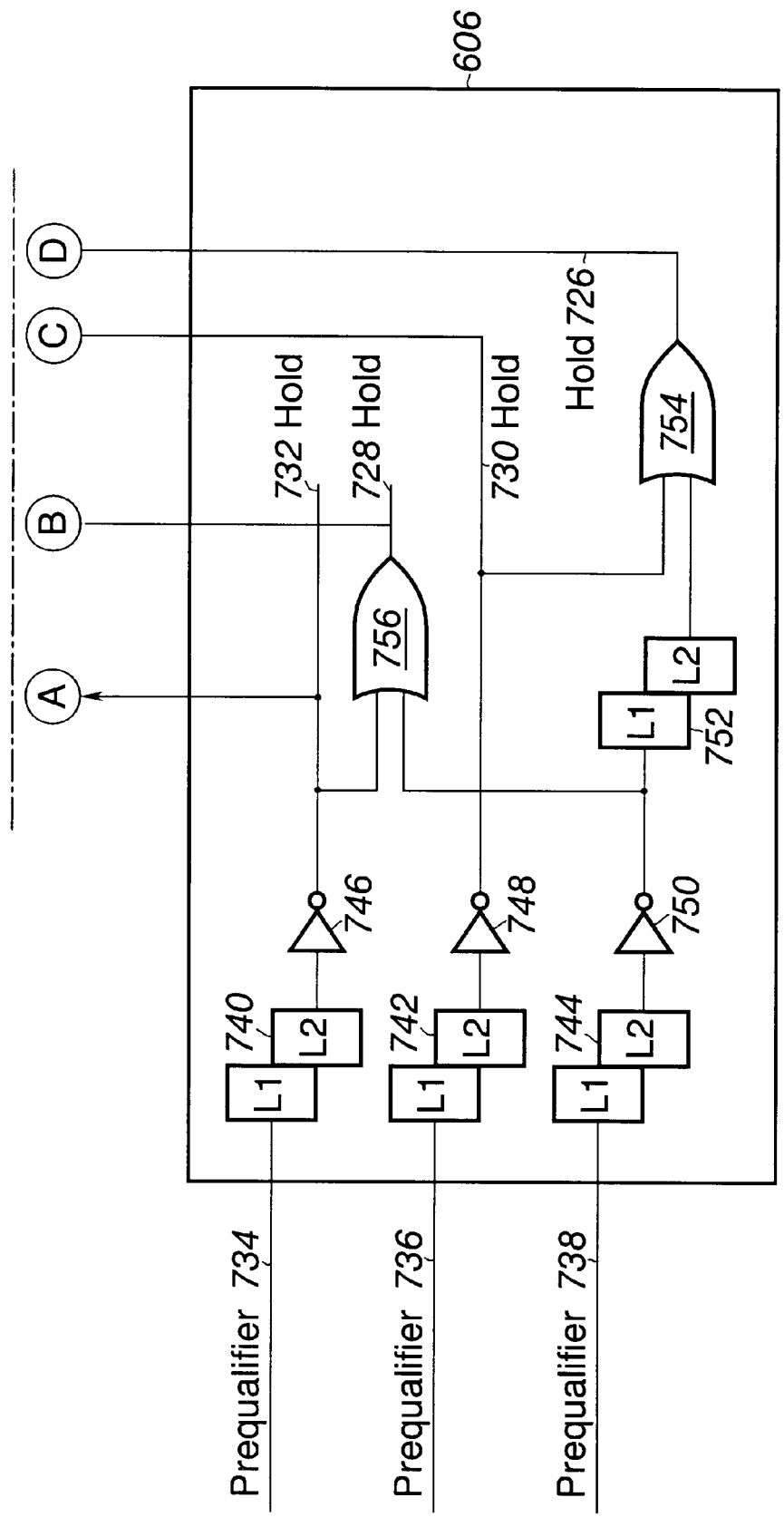

Refer now to FIG. 7 illustrating data staging circuit 608 and prequalifier reclocking circuit 606 in further detail. Staging circuit 608 includes a plurality of latch pairs 702–710. Latch pairs 702 and 704 receive a datastream 122 to be launched onto memory bus 118, FIG. 4. Latch pair 702 and 704 are clocked by C1/C2 clock 712 from clock regenerator 714 as described in conjunction with FIG. 5A hereinabove. The output of the L2 latch in latch pair 704 is coupled to the input of the L1 latch in latch pair 708. The output of the L2 of latch pair 702 is coupled to the input of the L1 latch in latch pair 706, and the output of the L2 latch in latch pair 706 is further coupled to the input of the L1 latch in latch pair 710. Outputs from the L1 latches of latch pair 708 and 710 form datastreams 422 and 424, respectively. Latch pair 706 is clocked by C1/C2 clock 716 output from clock regenerator 718, latch pair 708 is clocked by C1/C2 clock 720 output by clock regenerator 723, and latch pair 710 is clocked by C1/C2 clock 722 output by clock regenerator 724. Each of clock regenerator 714, 718, 723, and 724 generates the respective C1/C2 clock 712, 716, 720, and 722 from p-clock 102.

Each C1/C2 clock may be held by asserting a hold signal provided to the corresponding one of clock regenerators 714, 718, 723, and 724. In an embodiment of the present invention, hold signals provided to clock regenerators 714, 718, 723, and 724 may be active "low". However, an artisan of ordinary skill would understand that an alternative, complementary, embodiment having active "high" holds would be within the spirit and scope of the present invention. When a hold signal is asserted, C1 clock portion of each of the C1/C2 clock signals assumes a first logic state and the C2 portion assumes the complementary logic state, and hold these values, as previously discussed in conjunction with FIG. 5A. The hold signals provided to each of clock generator 714, 716, 723, and 724 are provided by prequalifier reclocking circuit 606. Hold 726 is coupled to clock regenerator 714. Hold 728, when asserted, holds clock regenerator 718. Hold 730 is coupled to regenerator 723, and clock regenerator 724 is held by hold 732. Each of holds 726–732 are derived from prequalifiers 734, 736, and 738 by prequalifier reclocking circuit 606. Prequalifier 734–738 are delayed one cycle of p-clock 102 by a corresponding one of latch pairs 740, 742 and 744, and inverted by a corresponding one of inverters 746, 748, and 750. Note that the C1/C2 clocks into latch pair 740, 742, and 744 have not been illustrated in FIG. 7, for simplicity. However, it would be understood by an artisan of ordinary skill that a C1/C2 clock pair is provided to these latches, the C1/C2 clock pair being derived from p-clock 102.

The output of inverter 750 is delayed an additional p-clock cycle in latch pair 752 and ORed with an output of inverter 748 in OR gate 754 to generate hold 726. The output of inverter 750 is also ORed with an output of inverter 746, in OR gate 756 to form hold 728. The outputs of inverters 746 and 748 form holds 732 and 730, respectively.

Figure 8A:
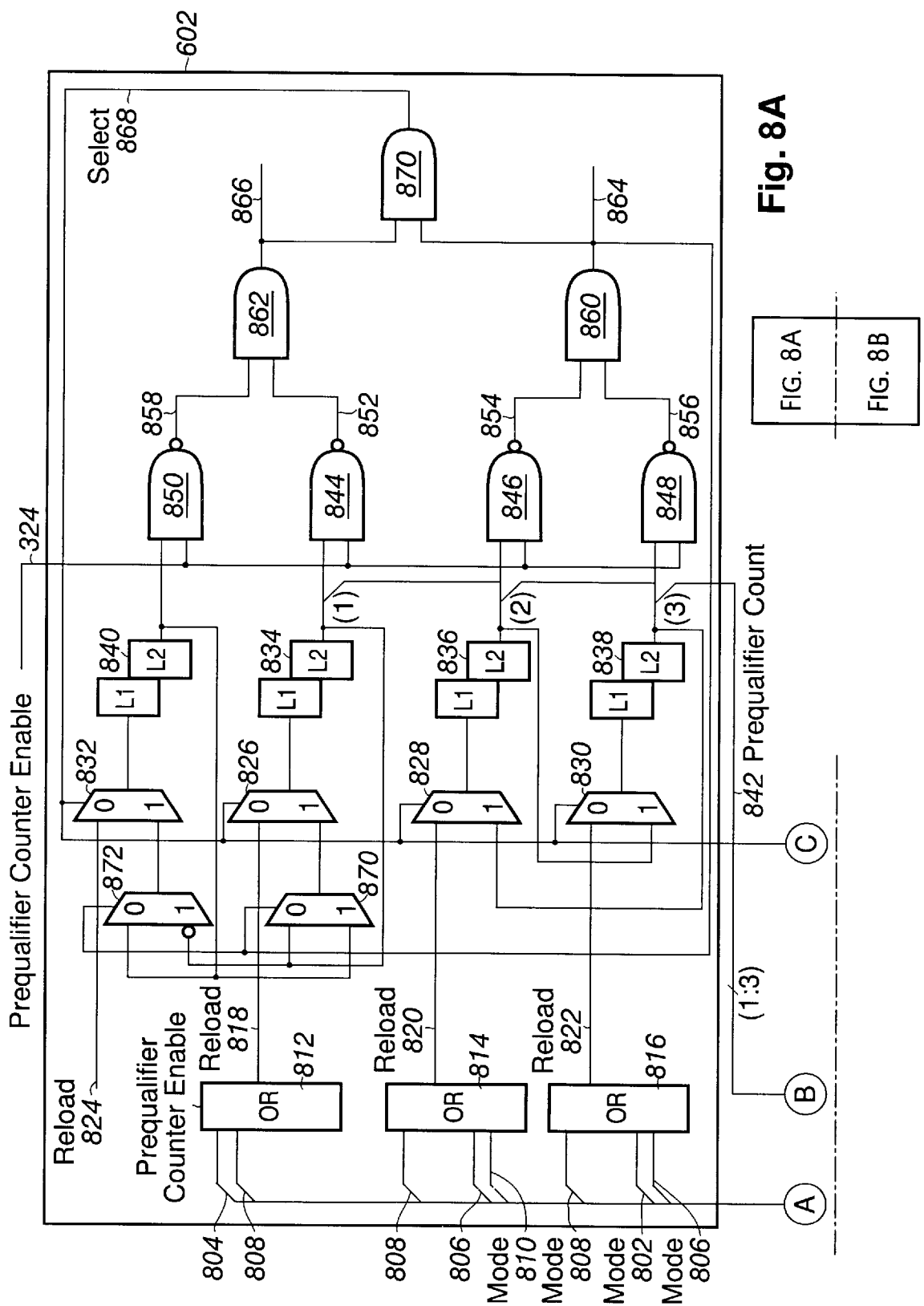
FIG. 8 illustrates, in partial schematic form, the prequalifier counter and prequalifier generator of FIG. 6 in accordance with an embodiment of the present invention.
Figure 8B:
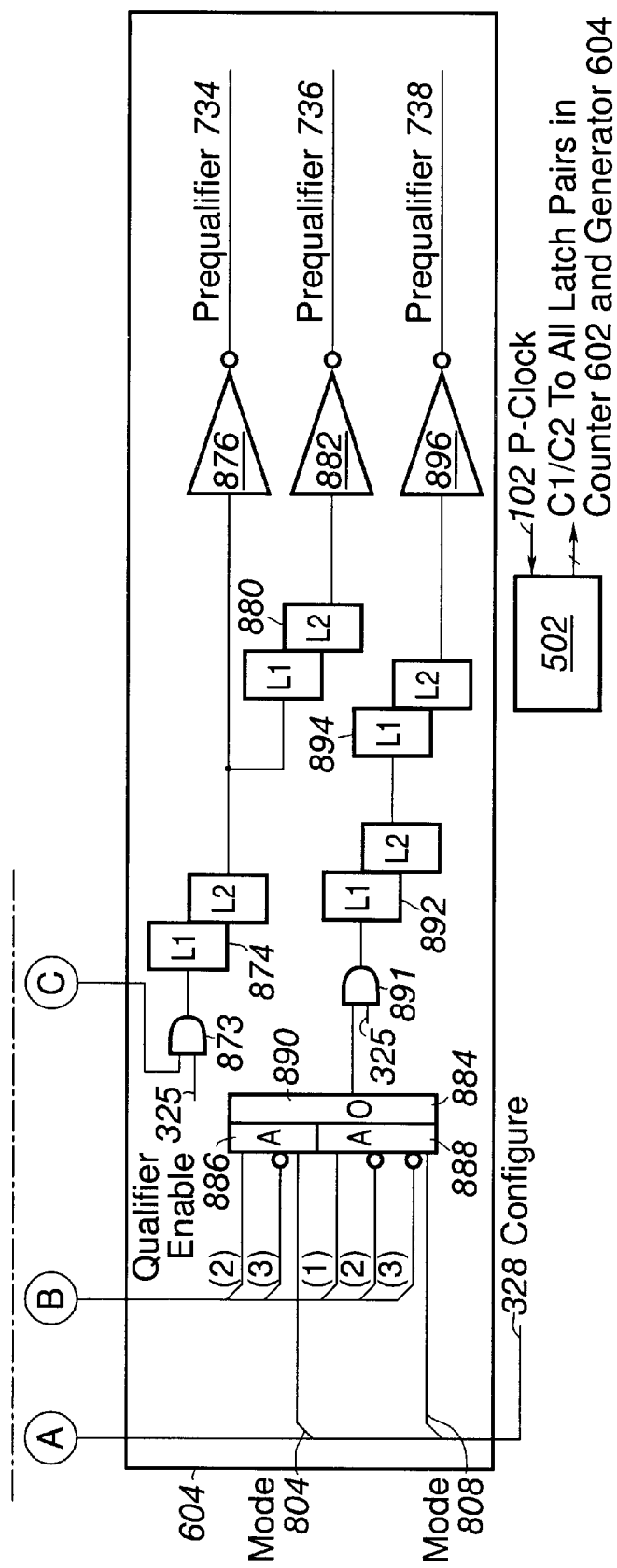

Prequalifiers 734–738 are generated in prequalifier generator 604. FIG. 8 illustrates prequalifier generator 604 and prequalifier counter 602 in further detail. Prequalifiers 734, 736 and 738 are generated by prequalifier generator 604 in accordance with count signals generated by prequalifier counter 602. The count signals generated by prequalifier counter 602 depend on the ratio of processor clock frequency to bus clock frequency, discussed above in conjunction with FIG. 3. Each of prequalifier counter 602 and prequalifier generator 604 receive configuration signal 328 from configuration decode 330, FIG. 3. Configure 328 includes a plurality of mode signals 802–810. Each of prequalifier counter 602 and prequalifier generator 604 receive one or more of mode signals 802–810.

Combinations of mode signals 802–810 are used to load prequalifier counter 602. Prequalifier counter 602 includes OR gates 812, 814, and 816. Reload 818, 820 and 822, generated by a respective one of OR gates 812, 814, and 816 are coupled to a first input of a corresponding one of multiplexers (MUXs) 826, 828, and 830. A fourth reload signal, reload 824 is coupled to a first input of MUX 832. Reload 824 may have a predetermined logic value, which, in an embodiment of the present invention, may be "0" or logic "low".

An output from each of MUXs 826–832 is coupled to an input of the L1 latch in a corresponding one of latch pairs 834, 836, 838, and 840. Each of latch pairs 834–840 is clocked by a C1/C2 clock signal derived from p-clock 102. The C1/C2 clock pair is provided in accordance with the description in conjunction with FIG. 5A, and in the interest of simplicity, the connection to the latch pairs 834–840 are not explicitly shown. Also, consistent with the discussion in conjunction with FIG. 5A, internal connections of the output of the L1 latch to the input of the L2 latch and latch pairs 834–840 would be understood by an artisan of ordinary skill in the art.

The outputs from the L2 latches in each of latch pairs 834–838 form a corresponding bit of prequalifier count 842 provided to prequalifier generator 604. Additionally, the outputs from each of the L2 latches in latch pairs 834–840 are coupled to a first input of a respective one of NAND gates 844, 846, 848, and 850. A second input of each of NAND gates 844–850 is coupled to prequalifier counter enable 324. Enable 324 is received from synchronous start unit 322, as illustrated in FIG. 3 discussed above. When, counter enable 324 is negated, counter 602 is held. Outputs 852, 854, 856, and 858 of NAND gates 844–850, respectively, are asserted in response to counter enable 324, and, therefore, AND gates 860 and 862 assert the respective outputs 864 and 866. Consequently, select 868 formed by an output of AND gate 870 is asserted.

Select 868 provides a MUX select signal to each of MUXs 826–832. The first input of MUXs 826–832 are selected by a first predetermined value of select 868. A second input of MUXs 826–832 may be selected by a second predetermined value of select 868. In an embodiment of the present invention, the first predetermined value may be a logic "false" value for select 868, that is, select 868 may be negated, and the second predetermined value may be a logic "true" value for select 868, that is, select 868 asserted. The second input to MUXs 828 and 830 are cross-coupled to the L2 latch outputs of latch pairs 838 and 836, respectively. The second input to MUX 826 is coupled to an output of MUX 870. MUX 870 has a first input, selected when output 864 from AND gate 860 is negated, coupled to the L2 latch output from latch pair 834. A second input to MUX 870 is coupled to the L2 latch output of latch pair 840, and is selected when output 864 is asserted. Similarly, the second input to MUX 832 is coupled to an output of MUX 872, having a first input also coupled to the L2 latch output of latch pair 840. The second input to MUX 872 may be an inverting input coupled to the L2 latch output of latch pair 834, and is selected when output 864 is asserted, output 864 also providing the MUX select to MUX 872.

Select 868 is also provided to prequalifier generator 604 to generate prequalifiers 734 and 736. Select 868 is provided to a first input in AND gate 873. A second input receives qualifier enable 325, generated by sync start unit 322, described below in conjunction with FIG. 9. An output of AND gate 873 is provided to an L1 latch input of latch pair 874, and delayed one cycle of p-clock 102 from which the C1/C2 clock pair to latch pair 874 is derived, as described hereinabove. The L2 output of latch pair 874 is inverted by inverter 876 to form prequalifier 734. The L2 output of latch pair 874 is also provided to the L1 input in latch pair 880. The L2 output from latch pair 880 is inverted by inverter 882 to provide prequalifier 736. Latch pair 880 introduces a delay of one cycle of p-clock 102 in prequalifier 736 relative to prequalifier 734.

Prequalifier generator 604 generates prequalifier 738 in response to prequalifier count 842. Count 842 is coupled to AND-OR logic 884. Bits two and three of prequalifier count 842 are coupled to first and second inputs of a first AND portion 886, in which the second input is an inverting input. Mode signal 804 is coupled to a third input of AND portion 886. Bits one, two and three of prequalifier count 842 are coupled to first, second and third inputs of a second AND portion 888 of logic 884, in which the second and third inputs are inverting inputs. Mode signal 808 is coupled to a fourth input in portion 888. OR portion 890 of logic 884 generates the logical OR of the "ands" generated by AND portions 886 and 888. An output of OR portion 890 is coupled to a first input of AND gate 891. A second input of AND gate 891 receives qualifier enable 325. An output of AND gate 891 is provided to cascaded latch pairs 892 and 894. Latch pairs 892 and 894 thus introduce a delay of two cycles of p-clock 102, and the L2 output in latch pair 894 inverted by inverter 896 to generate prequalifier 738.

Figure 9A:
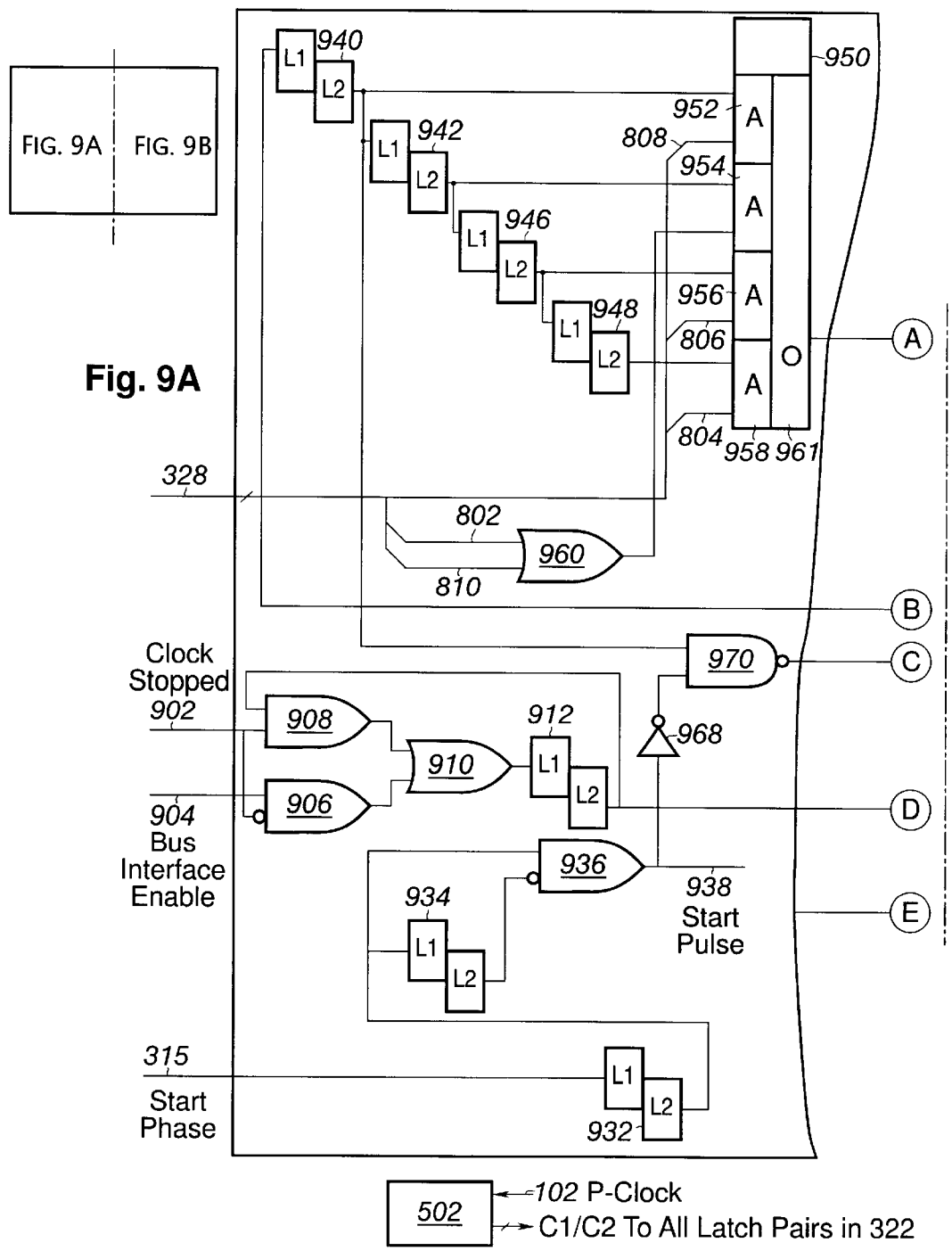
FIG. 9 illustrates, in partial schematic form, the synchronous start unit of FIG. 6 in accordance with an embodiment of the present invention.
Figure 9B:
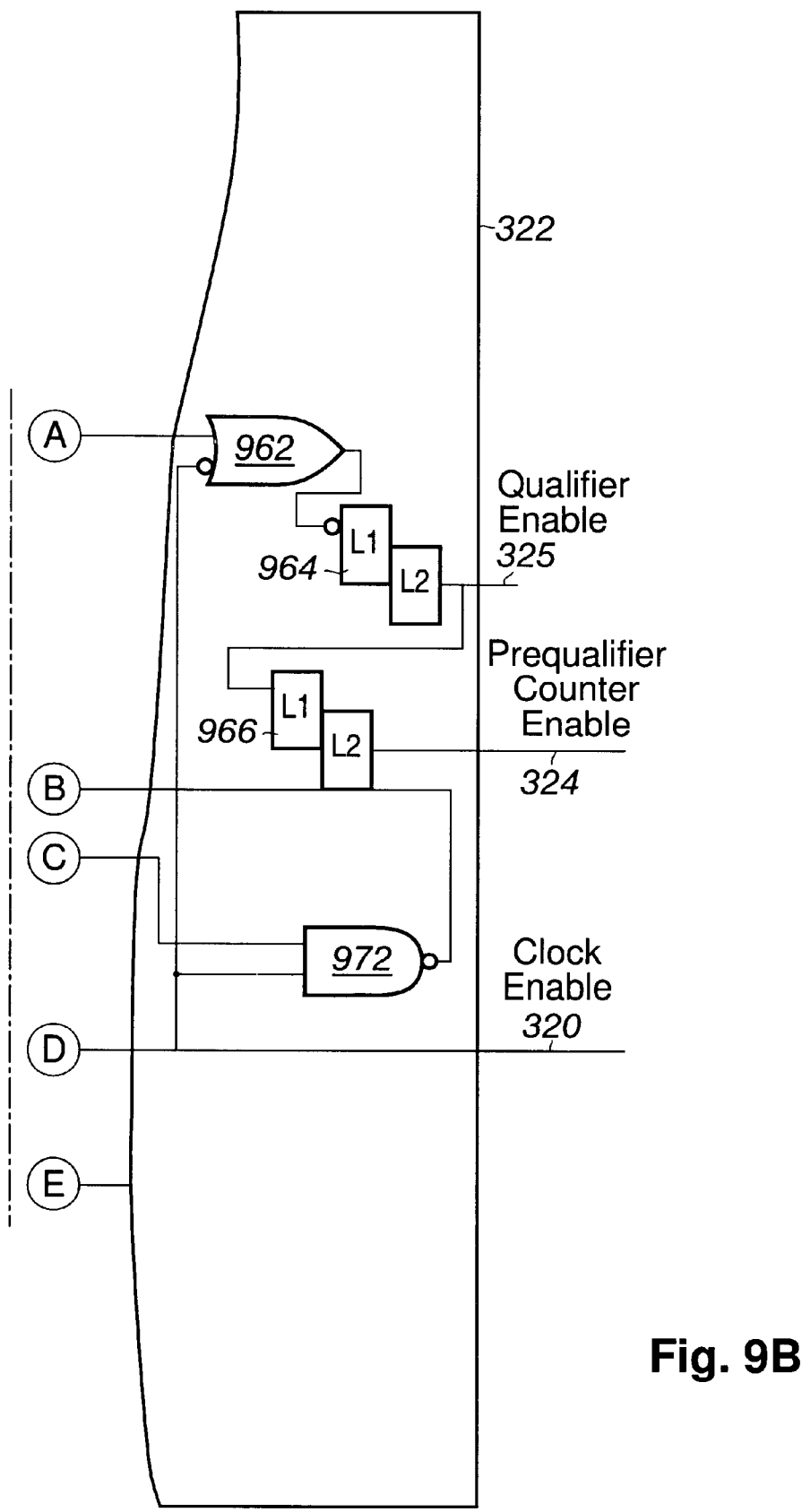

Prequalifier counter 602 is started by asserting enable 324. Enable 324 is generated by synch start unit 322 which synchronizes staging unit 310 with memory clock generator 314, FIG. 3. Synch start unit 322 is illustrated in FIG. 9. Memory clock generator 314, FIG. 3, is initiated when clock enable 326 is asserted. Clock enable 326 is provided by synch start unit 322 in response to clock stopped 902 and bus interface enable 904. Bus interface enable 904 is provided to a first input of AND gate 906. Bus interface enable 904 may be generated by setting a predetermined bit in an architected register in a CPU in accordance with the present invention, such as CPU 210, FIG. 2. A second, inverting, input of AND gate 906 is coupled to clock stopped 902. Clock stopped 902 is also coupled to a first input of AND gate 908. Outputs of AND gates 906 and 908 are coupled to inputs of OR gate 910. An output of OR gate 910 is coupled to the input of the L1 latch in latch pair 912. Latch pair 912 is clocked by a C1/C2 clock pair derived from p-clock 102, in accordance with the discussion in conjunction with FIG. 5A. For simplicity, the C1/C2 clock pair clocking latch pair 912 has not been shown in FIG. 9. The output of the L2 latch in latch pair 912 is coupled back to a second input of AND gate 908. This output also provides clock enable 326.

Clock stopped 902 is generated by clock control logic within the CPU including the present invention, such as CPU 210, FIG. 2. When asserted, clock stopped 902 indicates to synch start unit 322 that the processor clock is in a stopped state. Then through the action of clock stopped 902 via AND gate 908 and OR gate 910, latch 912, holds the previous value of bus interface enable 904. This facilitates testing of a CPU incorporating the present invention, wherein during scanning of a CPU under test, enable 904 may toggle between logic states. By holding the previous value, which may be a negated state of enable 904, stopped clocks are not restarted by the toggling of enable 904 during a scan of the CPU under test.

Asserting clock enable 326 initiates memory clock generator 314, FIG. 3, in accordance with the description in the aforesaid commonly owned co-pending U.S. Patent Application entitled "Memory Clock Generator and Method Therefor." As discussed therein, memory clock generator 314 signals that it has started running by sending start phase signal 315 to synch start unit 322. In an embodiment of the present invention, start phase signal 315 may be a pulse train having a period that is twice that of p-clock 102. Start phase 315 is coupled to latch pair 932, which is also clocked by a C1/C2 clock pair derived p-clock 102, in accordance with the principles described in conjunction with FIG. 5A. Thus, latch pair 932 introduces a delay of one p-clock period in start phase 315, which corresponds to a one-half cycle delay, or a 180° delay, in start phase signal 315. The output of latch pair 932 is coupled to an input of latch pair 934 and a first input of AND gate 936. A second, inverting, input is coupled to an output of latch pair 934, which is also clocked by a C1/C2 clock pair derived from p-clock 102, in accordance with the principles discussed in conjunction with FIGURE 5A. Latch pair 934 and AND gate 936 generate a start pulse 938. Start pulse 938 may have a rising edge synchronous with the falling edge of start phase 315, because of the delay introduced by latch pair 932. Start pulse 938 initiates the generation of prequalifier counter enable 324.

Prequalifier counter enable 324 is generated via cascaded latch pairs 940, 942, 946, and 948 and AND/OR logic 950. Each of latch pairs 940–948 is clocked by a C1/C2 clock pair generated from p-clock 102, as previously described. The C1/C2 clock pair provided to latch pairs 940–948 are not shown in FIG. 9, for simplicity. Latch pairs 940–948 and AND-OR logic 950 generate a preselected delay before prequalifier counter 602 is started by asserting prequalifier counter enable 324. Latch pairs 940–948 constitute a shift register, an output of each latch pair of which is coupled to a first input of a corresponding one of AND gates 952, 954, 956, and 958 in AND-OR logic 950. The preselected delay depends on the selected ratio of p-clock frequency to bus clock frequency. A second input of AND gate 952 is coupled to mode signal 808. AND gate 954 in AND-OR logic 950 receives the logical OR of mode signals 802 and 810, provided by OR gate 960. A second input of AND gate 956 receives mode signal 806 and a second input of AND gate 958 is coupled to mode signal 804. Outputs of AND gates 952–958 are OR'd in OR gate 961 in AND-OR logic 950, and the output of AND-OR logic 950 is coupled to a first input of OR gate 962. An output of OR gate 962 is delayed two p-clock cycles through two cascaded latch pairs 964 and 966, an output of latch pair 966 providing prequalifier counter enable 324. Additionally, an output of latch pair 964 provides qualifier enable 325. Thus, qualifier enable 325 is asserted one p-clock cycle earlier than prequalifier counter enable 324. An input to latch pair 964 is inverting, whereby the output of OR gate 962 is inverted before being clocked through latch pairs 964 and 966. Latch pairs 964 and 966 are clocked by a C1/C2 pair derived from p-clock 102, in accordance with the principles discussed in conjunction with FIG. 5A. A second, inverting, input of OR gate 962 is coupled to clock enable 326. Thus, when clock enable 326 is negated, prequalifier counter enable 324 is also negated, holding off prequalifier counter 602, independent of the state of signals in the shift register formed by latch pairs 940–948.

Prequalifier counter enable 324 is asserted in response to start pulse 938 which is inverted by inverter 968 and provided to an input of the shift register formed from latch pairs 940–948 at an input of the L1 latch in latch pair 940 via NAND gates 970 and 972. Inverter 968 output is coupled to a first input of NAND gate 970. The output of NAND gate 970 is coupled to a first input of NAND gate 972, an output of which provides the input to the shift register formed from latches 940–948. A second input of NAND gate 972 is coupled to clock enable 326. Thus, when clock enable 326 is negated, the output of NAND gate 972 is held in its logic "true" state independent of the logic state of start pulse 938. The second input of NAND gate 970 is coupled to the output of latch pair 940, which is also coupled to a first input of AND gate 952 in AND-OR logic 950, as previously described. When clock enable 326 is asserted, and start pulse 938 is asserted, a logic "false" is generated at the input to the shift register formed by latch pairs 940–948, and propagated through the shift register.

The text provided above has described the connectivity of the present invention. Description of the operation of the present invention will subsequently be provided in greater detail.

DESCRIPTION OF OPERATION

Continuing to refer to FIG. 9, in conjunction with the timing diagram of FIG. 10, initiation of the bus interface apparatus of the present invention will now be described. In the embodiment of the present invention illustrated in FIG. 10, VCO signal 318 is seen to be a periodic pulse train having a frequency twice that of p-clock 102. VCO signal 318 is used in the generation of memory clock signals, as illustrated in FIG. 3, and described in detail in the commonly owned co-pending U.S. Patent Application entitled "Memory Clock Generator" (Attorney Docket No. HQ9-99-036), incorporated herein by reference. As described therein, alternative embodiments of the present invention may have VCO signal 318 with frequencies that are other multiples of the processor clock frequency. As previously described, synch generator unit 322 receives start phase 315 from memory clock generator 314, FIG. 3. Because of the delay by one cycle of p-clock 102 in latch pair 932, start pulse 938 is generated one p-clock cycle after the initiation of start phase 315. The assertion of start pulse 938 produces a logic "low" at the input to the shift register formed from latch pairs 940–948, as described hereinabove. (It is assumed that clock enable 326 has been asserted.) Because, for the embodiment illustrated in the timing diagram of FIG. 10, the p-clock frequency to bus clock frequency ratio is two, mode signal 802 is asserted, and consequently after a two p-clock cycle delay, the output of OR gate 961 in AND-OR logic 950 falls because of the logic "low" propagating through latch pair 942. Two additional delays later, from latch pairs 964 and 966, prequalifier counter enable 324 is asserted. Similarly, referring to FIG. 9, now in conjunction with FIG. 11 illustrating a timing diagram for an embodiment in which the p-clock frequency to bus clock frequency ratio is two and one-half, mode signal 804 is asserted, whereby the logic "low" shifted through latch pairs 940–948 is delayed four p-clock cycles, and switches the output of AND gate 958 in AND-OR logic 950. After two additional delays through latch pairs 964 and 966, prequalifier counter enable 324 is asserted six p-clock cycles after the assertion of start pulse 938, as shown in FIG. 11.

The assertion of prequalifier counter enable 324 initiates prequalifier counter 602. Referring now to FIG. 8, in conjunction with the timing diagrams in FIGS. 10 and 11, the operation of prequalifier counter 602 and prequalifier generator 604 will be discussed. Prequalifier counter 602 constitutes two cascaded two-bit Gray code countdown generators. As previously described, in an embodiment of the present invention, a plurality of bus clock cycles to p-clock cycle ratios are supported. A particular bus clock period may be preselected by setting a data value in an architected register in the CPU which data value is then provided to configuration decode 330 via configuration control 332. Configure signal 328, as previously described, includes a plurality of mode signals 802–810. In an embodiment of the present invention, the plurality of bus clock to processor clock periodicity ratios may include the values two, two and one-half, three, three and one-half, and four, corresponding to the assertion of mode signal 802, 804, 806, 808, and 810, respectively.

Mode signals 802–810 are provided to one or more of OR gates 812–816, as previously described. The output of OR gates 812–816 encode the initial count of prequalifier counter 602. The full count sequence of prequalifier counter 602 is: 7→5→4→2→3→1→0. The full count sequence corresponds to a bus clock period to p-clock period ratio of three and one-half. This ratio corresponds to mode signal 808 being asserted, and thus, mode signal 808 is provided to an input in each of OR gates 812–816.

Counter 602 counts down from the initial count, defined through reload 818–822, depending on the preselected ratio of the bus clock period to p-clock period. For a ratio of four, the count sequence is initiated at two, for a ratio of three and one-half, the sequence starts at seven, for a ratio of three, the count sequence begins at three, for a ratio of two and one-half, the sequence starts at four, and for a ratio of two, the sequence initiates at one. For each mode, the count rolls over after reaching zero, in response to select 868 going "low". As previously described, prequalifier generator 604 then asserts, after a one p-clock cycle delay, prequalifier 734, and, after a two p-clock cycle delay, prequalifier 736.

Figure 10A:
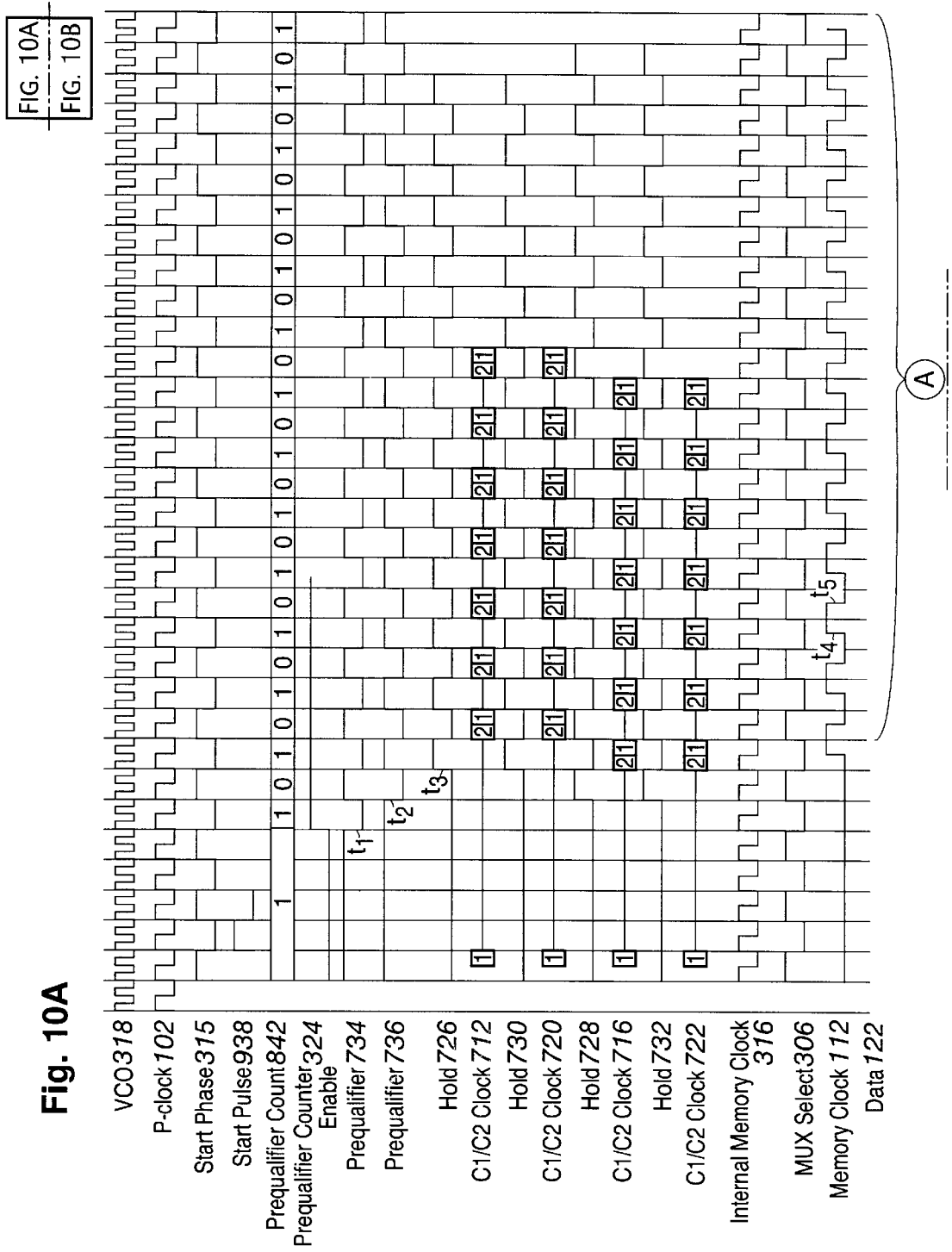
FIG. 10 illustrates a timing diagram in accordance with an embodiment of the present invention.
Figure 10B:
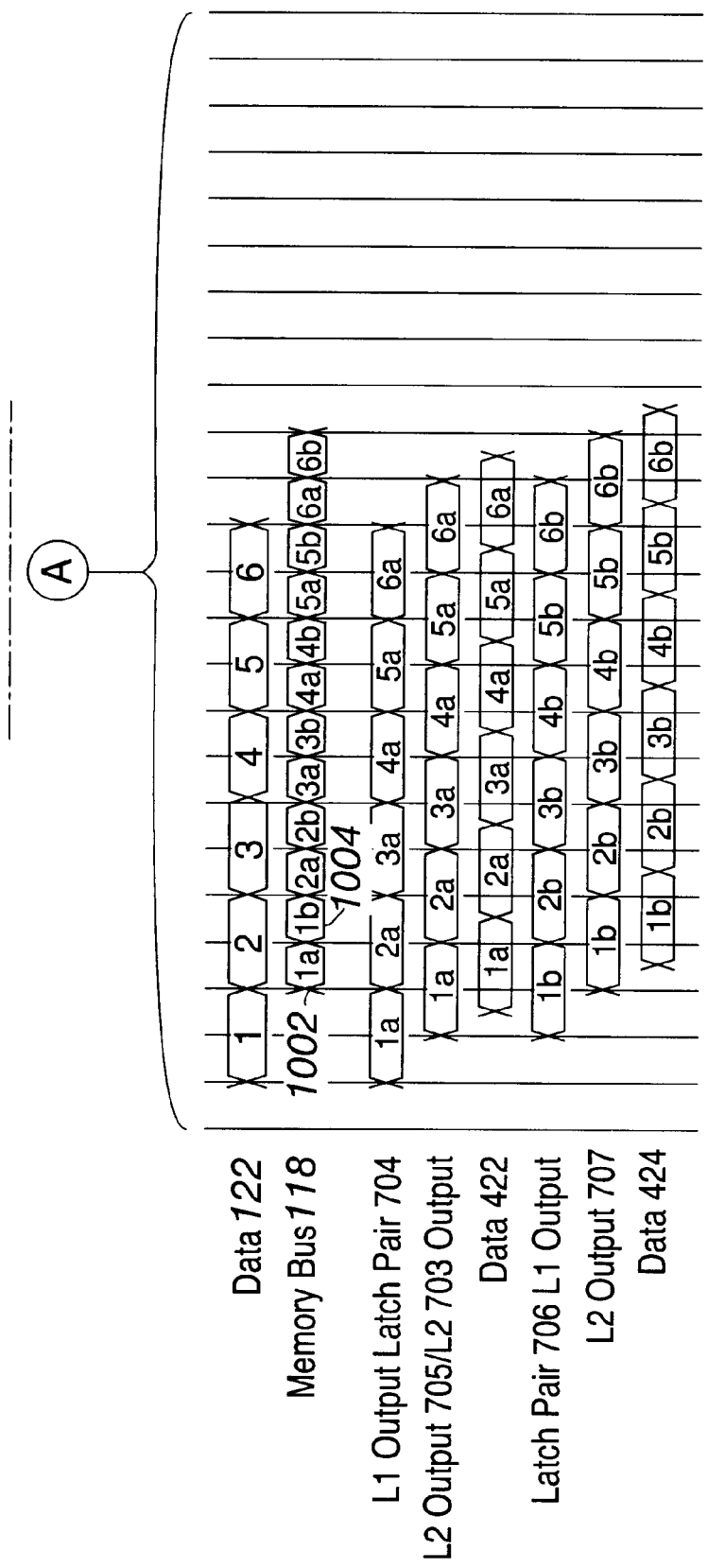
Figure 11A:
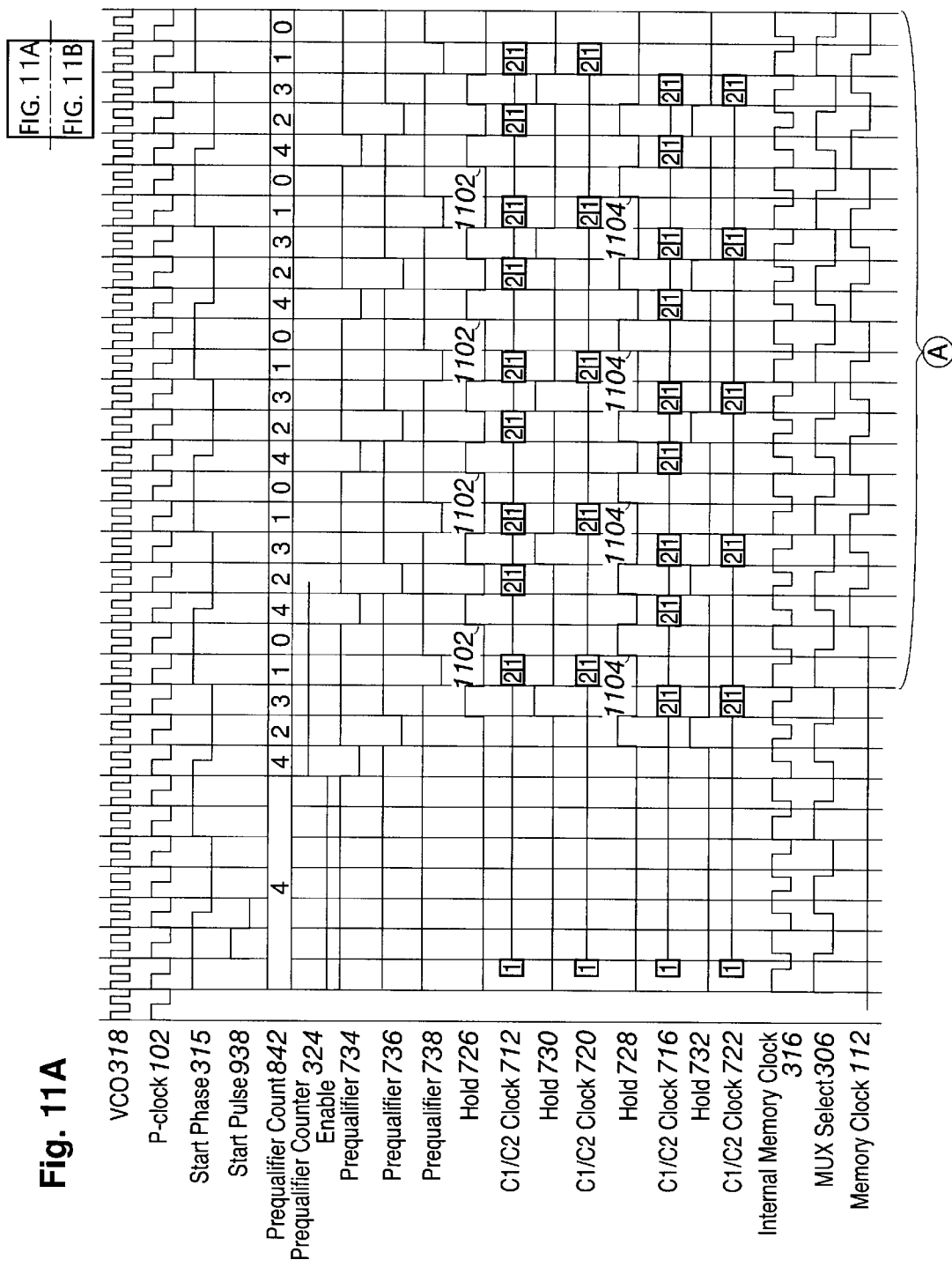
FIG. 11 illustrates a timing diagram in accordance with another embodiment of the Present invention.
Figure 11B:
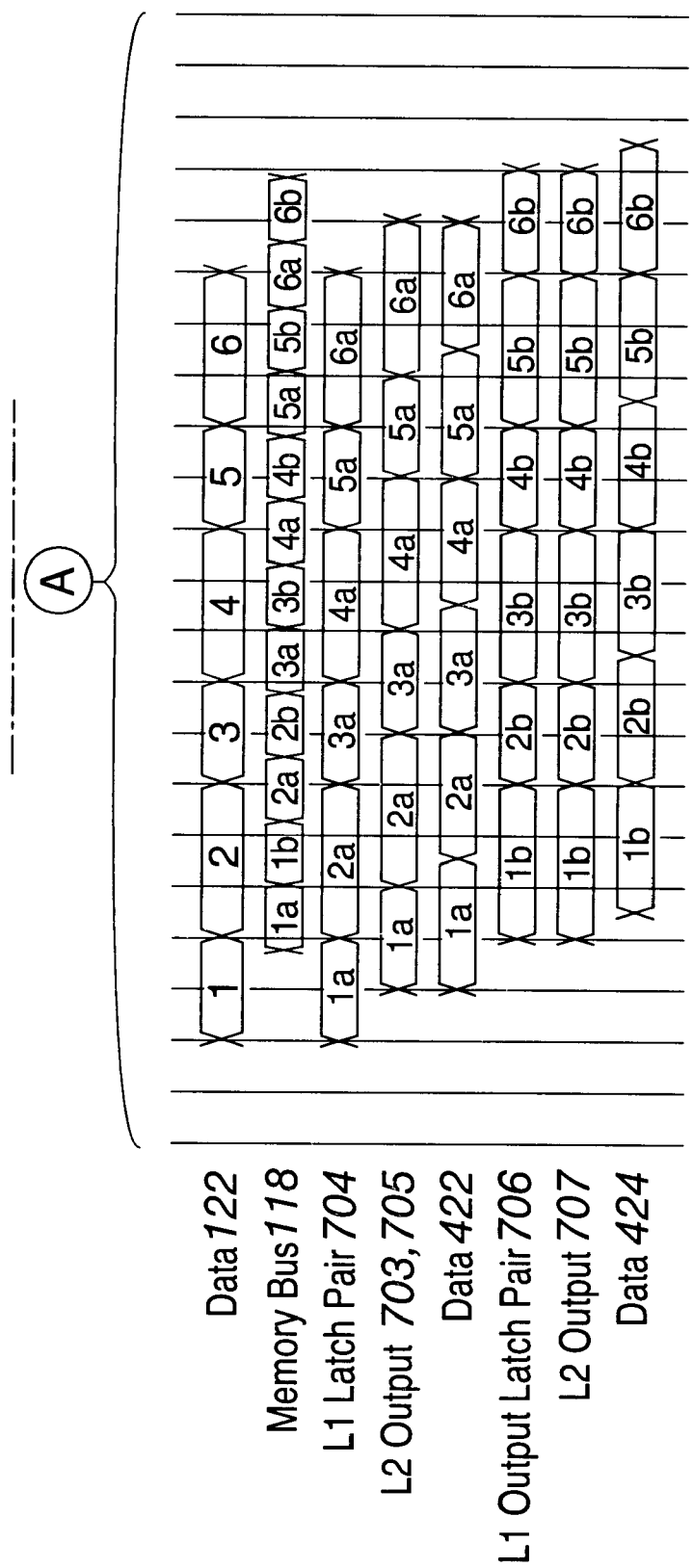

The timing diagram in FIG. 10, of an embodiment of the present invention in which the selected ratio of bus clock period to p-clock period is two depicts the count sequence for prequalifier count 842. As described hereinabove, the count sequence begins with one and then alternates between zero and one. After qualifier enable 325 has been asserted and coincident with the count returning to one on prequalifier count 842, prequalifier 734 goes "low" because of the one-cycle delay through latch pair 874. Note also that there is a one p-clock cycle delay between the reload of the initial count on the transition of select 868, and the launching of the initial count value on prequalifier count 842 because of the delay through latch pairs 834–840. Prequalifier 736 transitions one p-clock cycle after prequalifier 734, because of the delay through latch pair 880.

Similarly, the timing diagram of FIG. 11 illustrates the timing of prequalifiers 734–738 in an embodiment in which the selected ratio of bus clock period to p-clock period is two and one-half. As described hereinabove, for this mode, the counter sequence begins with the value four, and counts down to zero. This is shown in prequalifier count 842. After qualifier 325 has been asserted and simultaneous with the initial count on prequalifier count 842, prequalifier 734 goes "low", because of the one p-clock cycle delay through latch pair 874. Recall that in the embodiment of the present invention illustrated in FIGS. 10 and 11, the active status of prequalifiers 734–738 are logic "low." However, it would be understood by an artisan of ordinary skill that alternative embodiments employing complementary logic would be within the spirit and scope of the present invention.

For a clock ratio of either two and one-half times or three and one-half times, prequalifier 738 is also used to generate holds 726 and 728, FIG. 7. Prequalifier count 842 is decoded in AND-OR logic 884. When a preselected count is launched on prequalifier count 842, the output of OR gate 890 in AND-OR logic 884 transitions, and after a delay of two p-clock cycles, through latch pairs 892 and 894, prequalifier 738 goes "low".

Prequalifier 734, 736 and 738 are delayed and inverted in prequalifier reclocking unit 606 to generate holds 726–732. Refer now to FIG. 7, illustrating prequalifier reclocking circuit 606, in conjunction with timing diagrams in FIGS. 10 and 11. Hold 730 and 732 are generated by delaying prequalifiers 736 and 734, respectfully, by one p-clock cycle and inverting.

Referring first to FIG. 10, illustrating a timing diagram of an embodiment of the present invention in which the bus clock period is twice the p-clock, prequalifier 734 and 736 are seen to be a periodic train of pulses having a period of twice the p-clock period. The start of prequalifier 734, labeled $t_1$ occurs one p-clock cycle ahead of the start of prequalifier 736, labeled $t_2$, in accordance with the embodiment of prequalifier generator 604 illustrated in FIG. 8. In the embodiment of FIG. 10 in which the memory clock frequency is one-half that of the p-clock, prequalifier 738, as discussed hereinabove in conjunction with FIG. 8, is held "high," that is, in its inactive state. Therefore, after inversion in inverter 750, FIG. 7, the complement of prequalifier 738 thus generated, and used in generating holds 726 and 728 via OR-gates 754 and 756, respectively, does not affect either of holds 726 and 728. Consequently, prequalifier 738 has been omitted from FIG. 10.

Holds 726–732 are generated in response to prequalifiers 734 and 736. In the embodiment corresponding to the timing diagram of FIG. 10, holds 728 and 732 are generated in response to prequalifier 734, and are the same value because, as described hereinabove, prequalifier 738 does not affect the value of hold 728. As illustrated, hold 728 and 732 are the inversion of prequalifier 736, delayed by one cycle of p-clock 102. Similarly, holds 726 and 730 are the inverse of prequalifier 736, delayed by one cycle of p-clock 102.

As described in conjunction with FIG. 7, and FIG. 5A, C1/C2 clocks 712, 716, 720, and 722 are generated from p-clock 102 and holds 726, 728, 730, and 732, respectively. As discussed in conjunction with FIG. 5A, each of the C1/C2 clocks is held when the corresponding one of holds 726, 728, 730, and 732 are asserted. Additionally, a corresponding one of C1/C2 clocks 712, 720, 716, and 722 are shown in FIG. 10. The active state of the respective one of the C1 and C2 clocks in each of C1/C2 clock pairs 712, 716, 720, and 722 is illustrated by the corresponding numeral "1" and "2". When the corresponding one of holds 726, 728, 730, and 732 is asserted, each of the C1 and C2 clocks for the respective one of the hold signals are held. (Recall that in an embodiment of the present invention, holds 726–732 may be active "low".) This is illustrated in FIG. 10 by the straight line portions of each of the timing traces for C1/C2 clocks 712, 716, 720, and 722. In an embodiment of the present invention, the C1 clock may be held in its active state, and the C2 clock may be held in its inactive state, as shown in FIG. 10. Recall that in the active state of the C1 and C2 clocks, the corresponding L1 and L2 latch flushes a signal on its input through to the output of the respective latch. In the inactive state of the C1 and C2 clocks, the corresponding latch holds the signal value asserted on its input when the corresponding clock transitioned from the active to inactive state.

Data 122 is input to data staging circuit 608, FIG. 6. Data 122 is provided to the input of the L1 latch in each of latch pairs 702 and 704, FIG. 7. Data 122 is then clocked through latch pair 704 and 708 to form data stream 422. Similarly, data 122 is clocked through latch pairs 702, 706 and 710 to form data stream 424. In an embodiment of the present invention, data 122 may be 2n bits wide, and each of data streams 422 and 424, as well as memory data bus 118, n bits wide. In such an embodiment, n bits, for example, bits (0:n−1), may be provided to the input of the L1 latch in latch pair 702, and the remaining n bits, (n:2n−1) say, to the input of the L1 latch in latch pair 704. Alternatively, in an embodiment in which the processor delivers data onto distribution nets 114, FIG. 3, at a sufficiently high rate relative to memory clock 112, each of data 122, data streams 422 and 424, and memory data bus 118 may be n bits wide. It would be understood by an artisan of ordinary skill that, in either embodiment, the data "flowing" in data streams 422 and 424 may, in general, be different data.

The signals, as they are staged through staging circuit 608 are also illustrated in FIG. 10. Valid data appears at the input of latch pairs 702 and 704 one cycle of p-clock 102 after the assertion of hold 726, labeled $t_3$ in FIG. 10. Recall as discussed in conjunction with FIG. 5A, a clock generator may include delay elements delaying the application of the hold signals. Each of clock generators 714, 718, 723, and 724 input their respective holds through a latch pair clocked by p-clock 102. (Thus, each of the clock generators hold their respective C1/C2 clock pairs one p-clock 102 cycle after the assertion of the corresponding hold signal.) Consequently, L1 output of latch pair 704, as shown in FIG. 10, follows data 122 as the C1 clock in C1/C2 clock 712 is active. The data is then staged through the L2 latch of latch pair 704, and through the L1 latch of latch pair 708 to form data stream 422, having a one and one-half p-clock 102 cycle delay introduced thereby, as seen in FIG. 10. The L1 output of latch pair 702 is the same as the L1 output of latch pair 704, as latch pair 702 also receive data 122 and is clocked by C1/C2 clock 712. This data is then clocked through the L2 latch of latch pair 702, through latch pair 706 and the L1 latch of latch pair 710 to form data stream 424. The signals staged through latch pairs 702, and 706, outputs 703 and 707 are also shown in FIG. 10. In the timing diagram of FIG. 10, the respective values in data streams 422 and 424 are denoted using the labels "a" and "b", respectively. In the embodiment of FIG. 10, the corresponding data value in data stream 424 is delayed by one p-clock cycle relative to the data value in data stream 422, as seen in FIG. 10.

Data streams 422 and 424 are coupled to respective inputs of MUX 304, FIG. 4. MUX 304 selects one of data streams 422 and 424 for outputting to memory bus 118. In the embodiment of FIG. 10, when MUX select 306 is in a logic "low" state, MUX 304 selects data values from data stream 422 for outputting. Conversely, when MUX select 306 is logic "high", MUX 304 selects data values from data stream 424 for outputting. A portion of the timing for which each data value on memory bus 118 is valid is derived from corresponding time intervals for which the data value is valid in one of data streams 422 and 424, as illustrated in FIG. 10. MUX select 306 is generated by memory clock unit 308 which also generates memory clock 112, FIG. 4. Edges of memory clock 112, such as edges $t_4$ and $t_5$ are centered on flat top portions on memory bus 118, such as portions 1002 and 1004, FIG. 10. In this way, data output on memory bus 118 is centered with respect to memory clock 112.

The operation of such an embodiment of the invention in which the selected memory clock ration is two and one-half times is similar to the operation described in conjunction with FIG. 10. However, because the ratio of the clock periods is nonintegral, prequalifier 738 is also used in the generation of holds 726 and 728. Referring now to FIG. 11, as discussed previously, in conjunction with FIG. 8, prequalifier count 842 begins with an initial count of four. Similar to the embodiment discussed in FIG. 10, prequalifier 734 generates a pulse each time the count returns to the initial value, as shown in FIG. 11. Prequalifier 736 is delayed by one p-clock cycle from prequalifier 734 by latch pair 880, FIG. 8. Because mode 804, FIG. 8, is active, AND-OR logic 884 decodes prequalifier count 842, and in conjunction with the two cycle delays introduced by latch pairs 892, 894, prequalifier 738 outputs a pulse delayed by two p-clock cycles following the count of "two." In an embodiment of the present invention, the active status of prequalifiers 734–738 may be logic "low" and the pulses output in prequalifier 734–738 may be thus "low," as shown in FIG. 11. Each pulse is one p-clock cycle wide.

Prequalifier 738 introduces additional pulses into holds 726 and 728. Pulses 1102 on hold 726 are generated from prequalifier 738 through the action of latch pair 752 and OR gate 754. Similarly, pulses 1104 on hold 728 arise from prequalifier 738 through the action of OR gate 756. Note that pulses 1102 are delayed relative to pulses 1104 by one p-clock cycle because of latch pair 752. The operation of bus interface apparatus illustrated in FIG. 4, is otherwise similar to the operation as described in conjunction with FIG. 10.

However, because the embodiment as illustrated in FIG. 11 has a memory clock period that is a nonintegral multiple of the period of p-clock 102, the data valid intervals of input data stream 122 are not uniform. As labeled in FIG. 11, the odd-numbered portions of data stream 122 have a duty cycle, or data valid interval, that is shorter than that of the even-numbered portions. Additionally, as described in the commonly owned co-pending U.S. Patent Application entitled "Memory Clock Generator and Method Therefor," incorporated herein by reference, the duty cycle of internal memory clock 316 is not fifty percent. However, it would be understood by an artisan of ordinary skill that alternative embodiments having a higher ratio of a frequency of VCO signal 318 to a frequency of p-clock 102 would eliminate the non-fifty-percent duty cycle, and such embodiments are within the spirit and scope of the present invention. That is, the width of the logic "high" portions and the width of the logic "low" portions are unequal. As a consequence, some skew remains between data on memory bus 118, and memory clock 112, as shown in FIG. 11. The asymmetry in the duty cycle in internal memory clock 316 can be shifted between the logic "high" portion and the logic "low" portion in response to a control signal, as discussed in the aforementioned co-pending, commonly owned U.S. Patent Application entitled "Memory Clock Generator and Method Therefor". In the embodiment corresponding to the illustration of FIG. 11, this slightly delays memory clock 112 relative to the center of the data valid interval on memory bus 118. By shifting the duty cycle, the asymmetry may be shifted such that the edges in memory clock 112 relative to the data on memory bus 118 are early relative to the center of the data valid interval on memory bus 118. Thus, by selecting the duty cycle of memory clock 316, the shift in clock edges resulting therefrom can be selected to compensate other sources of skew that may shift memory clock 112 relative to the center of the data valid on memory bus 118.

Figure 12B:
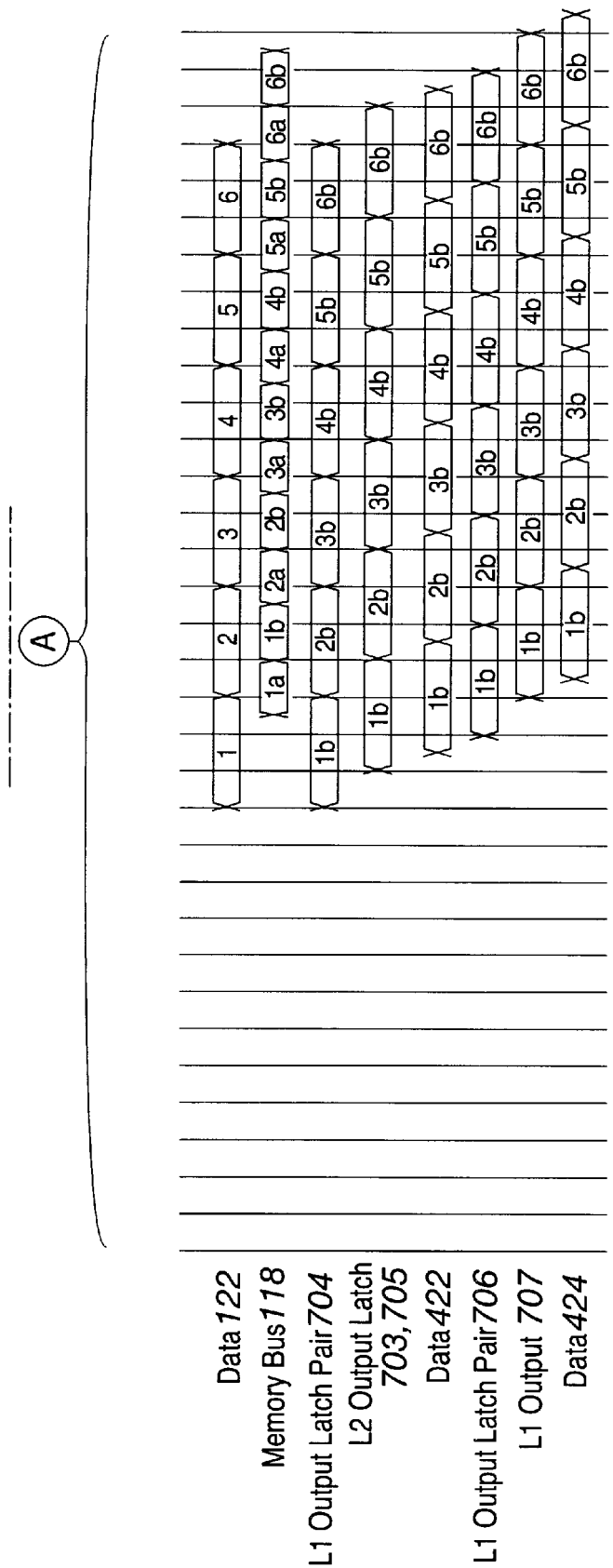
FIG. 12 illustrates a timing diagram in accordance with yet another embodiment of the present invention.
Figure 13A:
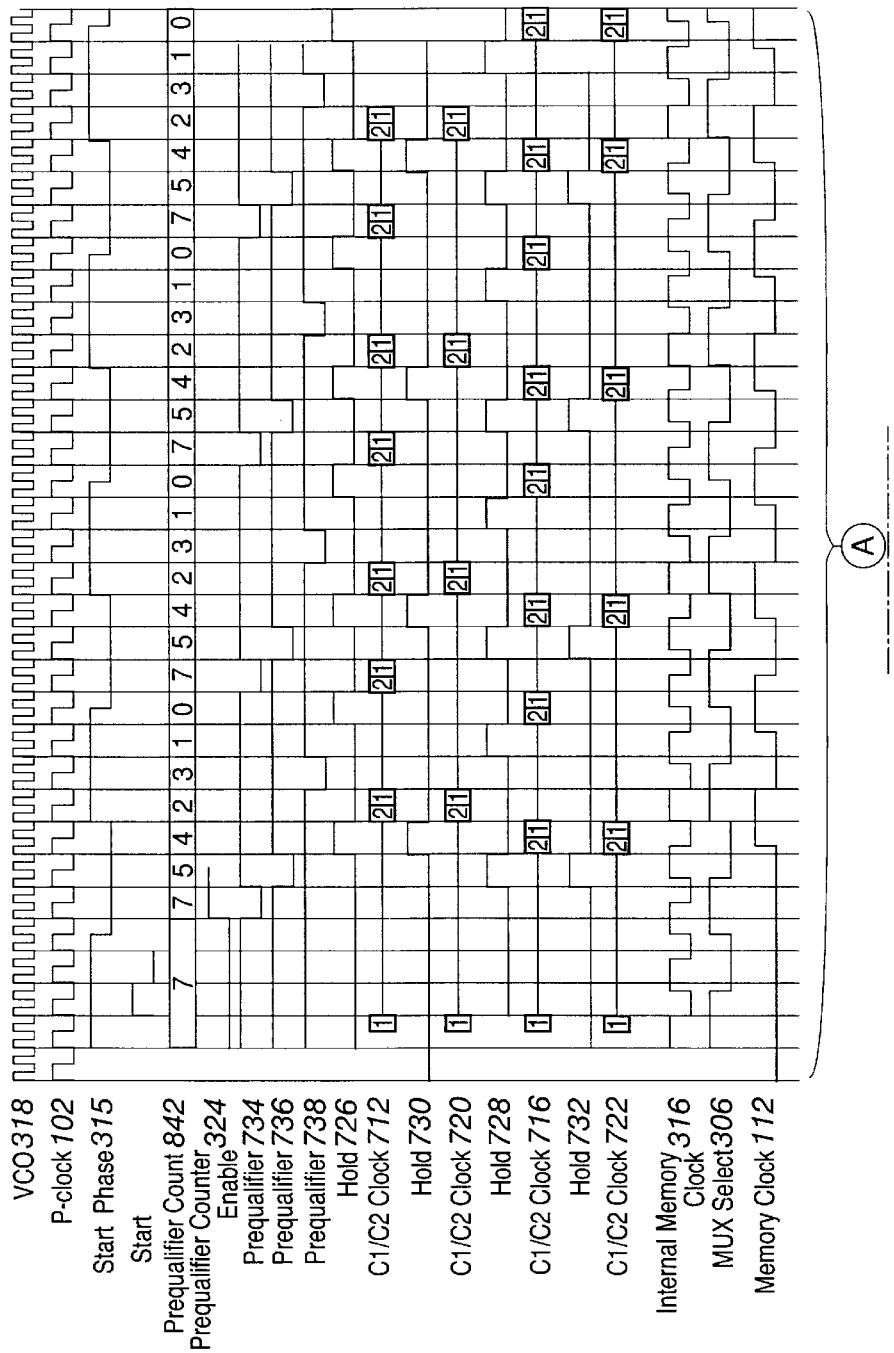
FIG. 13 illustrates a timing diagram in accordance with still another embodiment of the present invention.
Figure 13B:
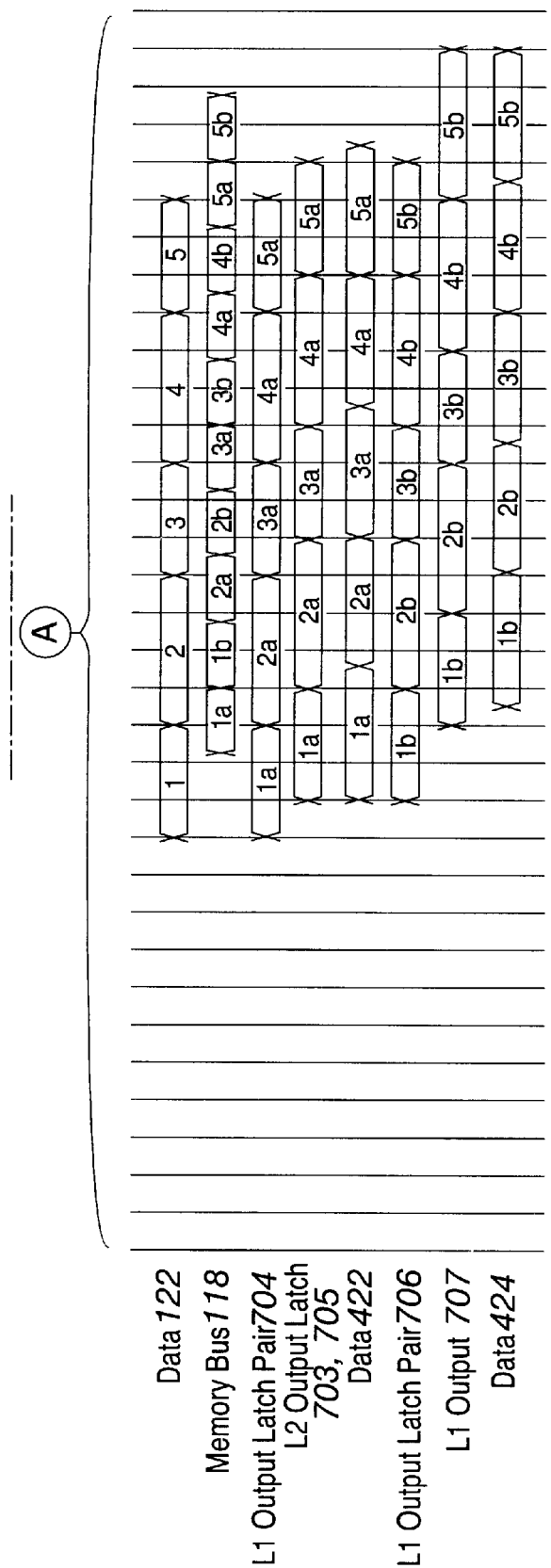
Figure 14A:
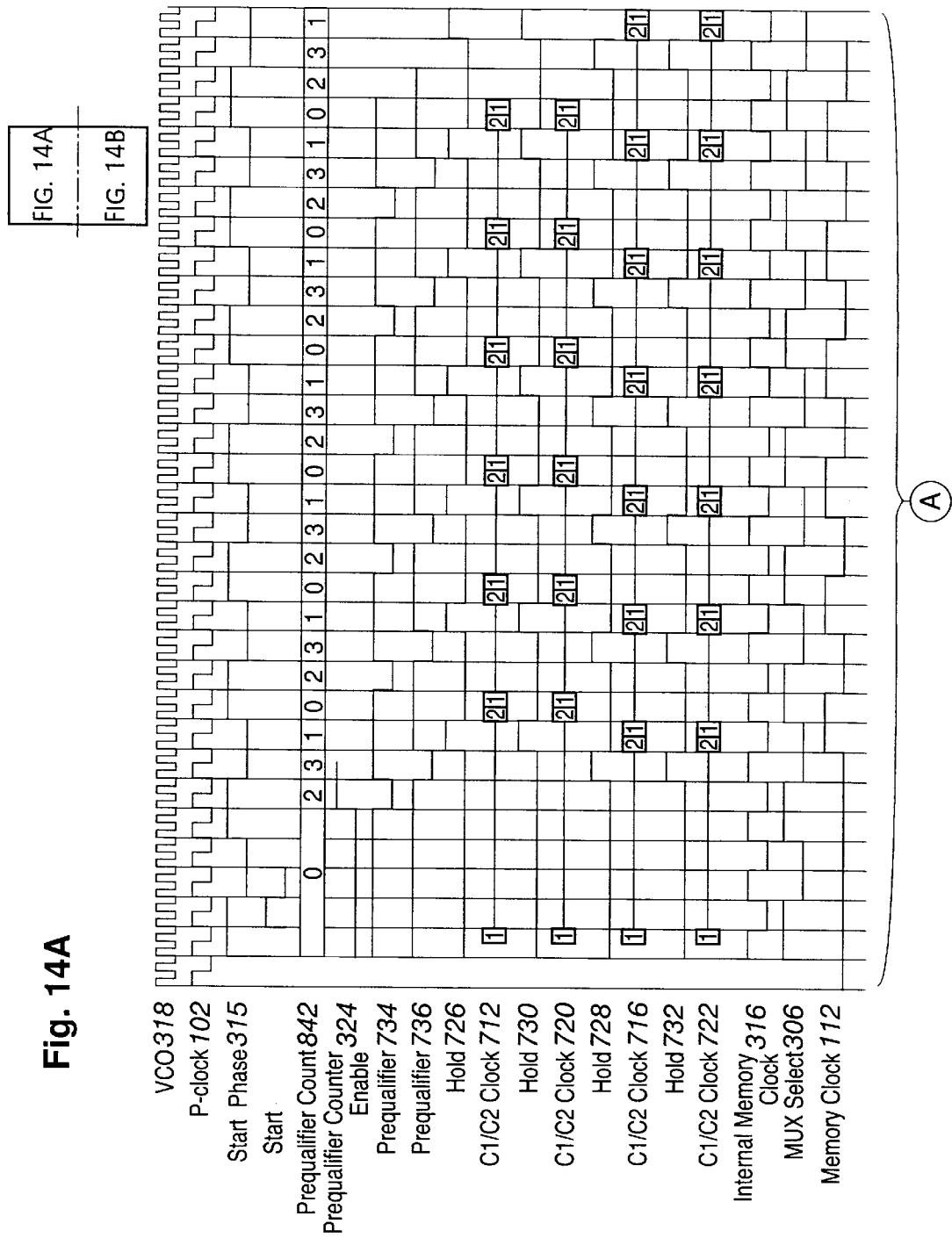
FIG. 14 illustrates a timing diagram in accordance with yet another embodiment of the present invention.
Figure 14B:
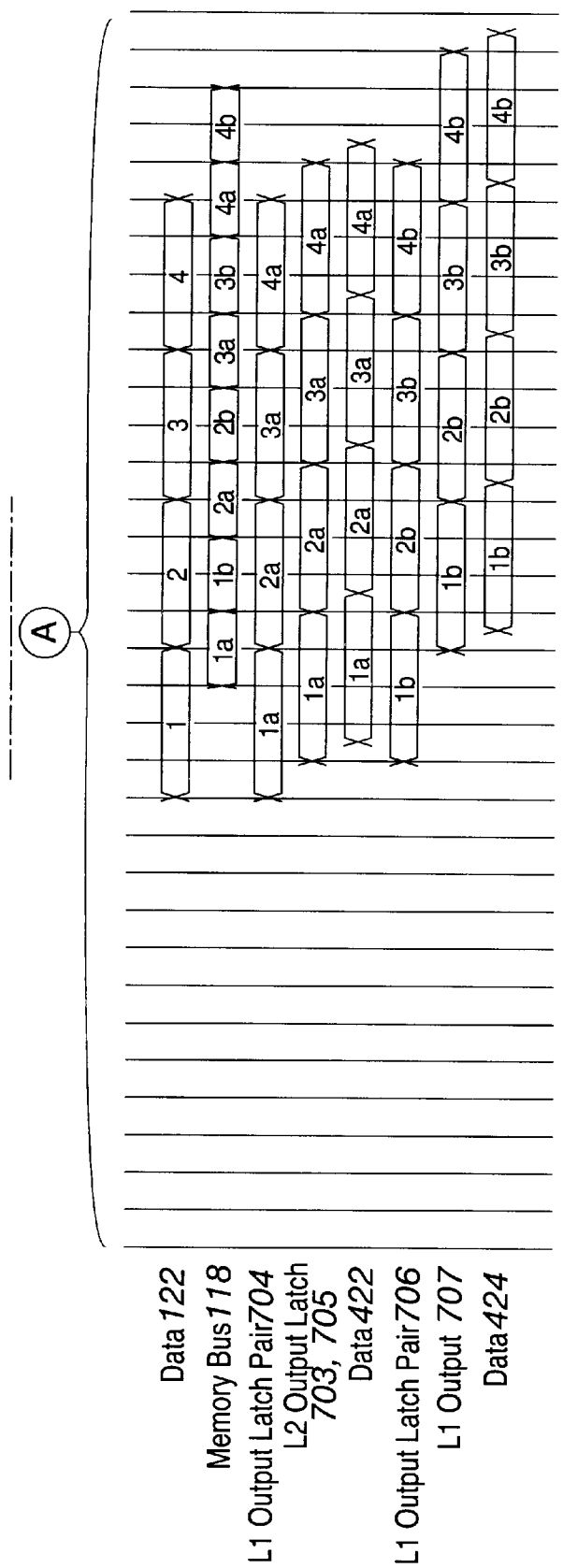

Timing diagrams for embodiments of a bus interface in accordance with the present invention having clock period ratios of three, three and one-half, and four, are illustrated in FIGS. 12, 13, and 14, respectively. The signals illustrated therein are the same as those shown in FIGS. 10 and 11, and, the operation of these embodiments is the same as discussed in conjunction with FIGS. 10 and 11. Thus, an artisan of ordinary skill would understand the operation of these embodiments without further describing them in detail.

In this way, a bus interface apparatus is provided in which the validity of data sent to memory (that is, the staging) relative to a reference clock edge is provided. Timing is controlled via the use of latches rather than conventional means, for example, delay lines, which may be more sensitive to skew variations induced by temperature and process dependencies.

Although the present invention and its advantages have been described in detail, it should be understood that various changes, substitutions and alterations can be made herein without departing from the spirit and scope of the invention as defined by the appended claims.

What is claimed is:

1. A bus interface apparatus comprising:
    circuitry operable for receiving a first data stream for outputting on a bus and generating second and third data streams in response to said first data stream;
    selection circuitry operable for alternatively selecting, in response to a select signal, from said second and third data streams a sequence of data values for outputting on said bus, wherein said select signal is generated in response to a first bus clock; and
    circuitry for outputting a second bus clock to said bus in response to said first bus clock, wherein a data valid interval of each value of said sequence of data values has a preselected relationship with respect to said second bus clock determined by said circuitry operable for generating said second and third data streams.

2. The apparatus of claim 1 wherein said selection circuitry comprises a multiplexer (MUX).

3. The apparatus of claim 2 wherein first and second inputs of said MUX are coupled to said circuitry operable for generating said second and third data streams, said first input operable for receiving said second data stream and said second input operable for receiving said third data stream.

4. The apparatus of claim 1 wherein said circuitry operable for generating said second and third data streams further comprises a plurality of storage elements operable for receiving said first data stream, and wherein a first set of said plurality of storage elements sequentially stores data values comprising said second data stream and wherein a second set of said plurality of storage elements sequentially stores data values comprising said third data stream.

5. The apparatus of claim 4 wherein said circuitry operable for generating said second and third data streams further comprises circuitry operable for generating a clocking signal for each of said plurality of storage elements, wherein each clocking signal includes first and second portions, and said circuitry operable for generating said clocking signal includes circuitry for holding said first portion of each said clocking signal in a first predetermined logic state and said second portion in a second predetermined logic state in response to a corresponding one of a plurality of hold signals, and wherein said clocking signals are generated in response to a first reference frequency.

6. The apparatus of claim 5 wherein said circuitry operable for generating said second and third data streams further comprises circuitry operable for generating said plurality of hold signals.

7. The apparatus of claim 5 wherein said first bus clock is generated in response to a second reference frequency comprising a voltage controlled isolator (VCO) output signal and said second reference frequency comprises a processor clock.

8. The apparatus of claim 6 wherein said circuitry operable for generating said hold signals comprises:
a count-down counter having programmable initial count value, said counter being operable for outputting a count value and a reload signal;
decode logic operable for receiving said count value and a plurality of control signals, said control signals operable for selecting a ratio of a period of said second bus clock to a period of said first reference frequency; and
a plurality of delay elements operable for receiving said reload signal and an output of said decode logic, said plurality of delay elements outputting a plurality of prequalifier signals in response thereto, wherein said plurality of hold signals is generated in response to said plurality of prequalifier signals.

9. The apparatus of claim 8 wherein said circuitry operable for generating said hold signals further comprises:
a first inverter operable for receiving a first input signal derived from a first one of said plurality of prequalifier signals;
a second inverter operable for receiving a second input signal derived from a second one of said plurality of said prequalifier signals;
a third inverter operable for receiving a third input signal derived from a third one of said plurality of said prequalifier signals;
a first OR gate operable for receiving an output from said first and third inverters, an output from said first OR gate and said first inverter being first and second hold signals; and
a second OR gate operable for receiving an output from said second inverter and a fourth input signal derived from an output of said third inverter, an output of said second OR gate being a third hold signal, and wherein said output of said second inverter comprises a fourth hold signal.

10. The apparatus of claim 9 wherein said first, second and third input signals are derived from a respective one of said first, second and third ones of said plurality of prequalifier signals, and said fourth input signal is derived from said output of said third inverter by introducing a delay of one cycle of said first reference frequency in said first, second and third ones of said plurality of prequalifier signals, and said output of said third inverter, respectively.

11. The apparatus of claim 8 further comprising circuitry operable for starting said count-down counter in response to a start signal, said starting circuitry starting said counter after a preselected time interval following said start signal.

12. The apparatus of claim 11 wherein said starting circuitry comprises:
a shift register operable for receiving a start pulse generated in response to said start signal; and
AND-OR logic operable for receiving a plurality of outputs from said shift register, and said plurality of control signals, an output of said AND-OR logic operable for starting said count-down counter.

13. A method of launching data on a bus comprising the steps of:
receiving a first data stream operable for launching on said data bus;
generating second and third data streams in response to said first data stream;
receiving a first bus clock and generating a select signal in response thereto;
alternately selecting from said second and third data streams a sequence of data values for launching on said bus in response to said select signal, wherein said step of generating second and third data streams comprises the steps of:
providing said first data stream to first and second pluralities of storage elements; and
staging said first data stream through said first and second pluralities of storage elements in response to a plurality of clocking signals, outputs of said first and second pluralities of storage elements providing said second and third data streams; and
generating a second bus clock to said bus in response to said first bus clock, wherein a data valid interval of each value of said sequence of data values has a preselected relationship with respect to said second bus clock determined by the step of generating said second and third data streams.

14. The method of claim 13 wherein each clocking signal of said plurality of clocking signals includes first and second portions, and wherein said step of generating second and third data streams further comprises the step of generating each of said plurality of clocking signals, said step comprising:
receiving said first reference frequency;
outputting said first portion, wherein said first portion has a phase of said first reference frequency;
outputting said second portion, wherein said second portion has a phase shifted by one-half cycle of said first reference frequency;
holding said first portion in a first predetermined state in response to a corresponding hold signal of a plurality of hold signals; and
holding said second portion in a second predetermined state complementary to said first predetermined state in response to said corresponding hold signal.

15. The method of claim 14 further comprising the step of generating said plurality of hold signals, said step of generating said plurality of hold signals comprising:
generating a count signal, wherein said count signal counts down from a preselected initial value;

generating a reload signal operable for reloading said initial value in response to said count signal reaching a predetermined count; and decoding said count signal in response to a plurality of control signals, said control signals operable for selecting a ratio of a period of said second bus clock to a period of said first reference frequency; and outputting a plurality of prequalifier signals, said plurality of prequalifier signals derived from an output of said decoding step and said reload signal, and wherein said plurality of hold signals are derived from said plurality of prequalifier signals.

16. The method of claim 15 wherein said step of generating said plurality of hold signals further comprises the step of starting said step of generating said count-down signal in response to a prequalifier counter enable signal.

17. The method of claim 16 further comprising the step of generating said prequalifier counter enable signal, said step of generating said prequalifier counter enable signal comprising the steps of:

shifting a start pulse generated in response to a start signal through a shift register; and decoding a plurality of outputs tapped off of said shift register in response to said plurality of control signals, an output of said decoding step comprising said prequalifier counter enable signal.

18. A data processing system comprising:

a memory coupled to a memory bus; and central processing unit (CPU), said CPU including a bus interface coupled to said memory bus, said bus interface comprising:

circuitry operable for receiving a first data stream for outputting on said memory bus and generating second and third data streams in response to said first data stream;

selection circuitry operable for alternatively selecting from said second and third data streams a sequence of data values for outputting on said bus, wherein said selection circuitry selects for outputting in response to a select signal, wherein said select signal is generated in response to a first bus clock; and circuitry for outputting a second bus clock to said memory bus in response to said first bus clock, a data valid interval of each value of said sequence of data values having a preselected relationship with respect to said second bus clock determined by said circuitry operable for generating said second and third data streams.

19. The data processing system of claim 18 wherein said circuitry operable for generating said second and third data streams further comprises a plurality of storage elements operable for receiving said first data stream, and wherein a first set of said plurality of storage elements sequentially store data values comprising said second data stream and wherein a second set of said plurality of storage elements sequentially store data values comprising said third data stream.

20. The data processing system of claim 19 wherein said circuitry operable for generating said second and third data streams further comprises circuitry operable for generating a clocking signal for each of said plurality of storage elements, wherein each clocking signal includes first and second portions, and said circuitry operable for generating said clocking signal includes circuitry for holding said first portion of each said clocking signal in a first predetermined logic state and said second portion in a second predetermined logic state in response to a corresponding one of a plurality of hold signals, and wherein said clocking signals are generated in response to a first reference frequency.

21. The data processing system of claim 20 wherein said circuitry operable for generating said second and third data streams further comprises circuitry operable for generating said plurality of hold signals.

22. The data processing system of claim 21 wherein said circuitry operable for generating said plurality of hold signals comprises:

a prequalifier reclocking circuit operable for receiving a plurality of prequalifier signals and outputting said plurality of hold signals in response thereto;

a prequalifier generator operable for generating said plurality of prequalifier signals in response to a prequalifier count signal and a reload signal; and a prequalifier counter operable for outputting said prequalifier count signal and said reload signal, said prequalifier counter having a programmable initial count value preselected in response to a plurality of control signals, said control signals operable for selecting a ratio of a period of said second bus clock to a period of said first reference frequency, and wherein said prequalifier counter is operable for starting in response to an enable signal.

23. The data processing system of claim 22 wherein said CPU further comprises a synchronous start unit operable for outputting said enable signal in response to a start signal generated by said CPU, and wherein said enable signal asserted after an interval comprising a preselected number of cycles of said first reference frequency.

24. The data processing system of claim 23 wherein said interval is preselected in response to said plurality of control signals.

* * * * *